US012686217B2

(12) United States Patent
Ukai et al.

(10) Patent No.: US 12,686,217 B2

(45) **Date of Patent: *Jul. 21, 2026**

(54) PRINTING DEVICE, AND PRINTING CASSETTE INCLUDING CASE THAT HOUSES INPUT PART, OUTPUT PART, AND TRANSMISSION MECHANISM FOR TRANSMITTING DRIVE FORCE FROM INPUT PART TO OUTPUT PART

(71) Applicant: BROTHER KOGYO KABUSHIKI KAISHA, Nagoya (JP)

(72) Inventors: Shinji Ukai, Kiyosu (JP); Kentaro Murayama, Kasugai (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 293 days.

This patent is subject to a terminal disclaimer.

(21) Appl. No.: 18/495,513

(22) Filed: Oct. 26, 2023

(65) Prior Publication Data

US 2024/0051314 A1 Feb. 15, 2024

Related U.S. Application Data

(63) Continuation of application No. 17/694,214, filed on Mar. 14, 2022, now Pat. No. 11,840,069, which is a (Continued)

(30) Foreign Application Priority Data

Sep. 30, 2019 (JP) ................................ 2019-178159

(51) Int. Cl.

*B41J 15/04* (2006.01)

*B41J 3/36* (2006.01)

(Continued)

(52) U.S. Cl.

CPC ................ *B41J 15/04* (2013.01); *B41J 3/36* (2013.01); *B41J 17/32* (2013.01); *B41J 32/00* (2013.01); *B41J 33/26* (2013.01)

(58) Field of Classification Search

None

See application file for complete search history.

(56) References Cited

U.S. PATENT DOCUMENTS

| | | | |
|---|---|---|---|
| 3,639,697 | A | 2/1972 | Koguma et al. |
| 3,672,603 | A | 6/1972 | Swain |

(Continued)

FOREIGN PATENT DOCUMENTS

| | | |
|---|---|---|
| CN | 1252357 A | 5/2000 |
| CN | 1313197 A | 9/2001 |

(Continued)

OTHER PUBLICATIONS

International Search Report for PCT/JP2020/034874 dated Nov. 2, 2020.

(Continued)

*Primary Examiner* — Matthew G Marini

(74) *Attorney, Agent, or Firm* — Kenealy Vaidya LLP

(57) ABSTRACT

A printing device includes a printing cassette, and a platen roller. The printing cassette includes: a print tape; an input part into which a drive force is to be inputted; an output part rotatable about a rotational axis extending in a first direction; a transmission mechanism for transmitting the drive force from the input part to the output part; and a case. The case houses therein at least a part of the print tape, at least a part of the input part, at least a part of the output part, and at least part of the transmission mechanism. At least a part of the output part is positioned outside the case. The output part is positioned inside an outer edge of the case in a projection (Continued)

view where the output part and the case are projected onto a plane perpendicular to the first direction.

17 Claims, 16 Drawing Sheets

Related U.S. Application Data continuation of application No. PCT/JP2020/034869, filed on Sep. 15, 2020.

(51) Int. Cl.

| | |
|---|---|
| ***B41J 17/32*** | (2006.01) |
| ***B41J 32/00*** | (2006.01) |
| ***B41J 33/26*** | (2006.01) |

(56) References Cited

U.S. PATENT DOCUMENTS

| | | | |
|---|---|---|---|
| 3,804,227 | A | 4/1974 | Cappotto et al. |
| 3,823,808 | A | 7/1974 | Murata et al. |
| 3,948,382 | A | 4/1976 | Nesbitt et al. |
| 4,034,935 | A | 7/1977 | Plaza et al. |
| 4,252,450 | A | 2/1981 | Goodman et al. |
| 4,351,619 | A | 9/1982 | Duke et al. |
| 4,397,574 | A | 8/1983 | Wojdyla |
| 4,402,619 | A | 9/1983 | Paque et al. |
| 4,490,059 | A | 12/1984 | Daughters |
| 4,499,513 | A | 2/1985 | Umeda |
| 4,538,931 | A | 9/1985 | Nagashima |
| 4,565,128 | A | 1/1986 | Moriyama et al. |
| 4,598,780 | A | 7/1986 | Iwasaki et al. |
| 4,668,961 | A | 5/1987 | Hiramatsu |
| 4,832,514 | A | 5/1989 | Basile |
| 4,856,921 | A | 8/1989 | Hatakeyama |
| 5,099,378 | A | 3/1992 | Turgeon |
| 5,145,268 | A | 9/1992 | Cavallini |
| 5,325,114 | A | 6/1994 | Fogle et al. |
| 5,402,954 | A | 4/1995 | Skavnak et al. |
| 5,435,657 | A | 7/1995 | Pearce et al. |
| 5,472,286 | A | 12/1995 | Uemura et al. |
| 5,595,447 | A | 1/1997 | Takayama et al. |
| 5,619,244 | A | 4/1997 | Manna |
| 5,645,360 | A * | 7/1997 | Iwane .................... B41J 3/4075 400/613 |
| 5,713,677 | A | 2/1998 | Petoskey |
| 5,788,387 | A | 8/1998 | Takayama et al. |
| 5,917,532 | A | 6/1999 | Cornell et al. |
| 5,959,652 | A | 9/1999 | Privin |
| 6,042,280 | A | 3/2000 | Yamaguchi |
| 6,126,344 | A | 10/2000 | Takayama et al. |
| 6,132,120 | A | 10/2000 | Yamaguchi et al. |
| 6,135,657 | A | 10/2000 | Martinez et al. |
| 6,190,067 | B1 | 2/2001 | Kobayashi et al. |
| 6,386,774 | B1 | 5/2002 | Takayama et al. |
| 6,511,238 | B1 | 1/2003 | Glize |
| 8,162,553 | B2 | 4/2012 | Vandermeulen |
| 9,566,808 | B2 | 2/2017 | Yamaguchi |
| 11,840,069 | B2 * | 12/2023 | Ukai ........................ B41J 32/00 |
| 2002/0012558 | A1 | 1/2002 | Huss et al. |
| 2002/0067943 | A1 | 6/2002 | Furuya et al. |
| 2004/0031875 | A1 | 2/2004 | Nonomura |
| 2004/0056143 | A1 | 3/2004 | Nonomura |
| 2004/0161278 | A1 | 8/2004 | Harada |
| 2005/0031393 | A1 | 2/2005 | Kishi et al. |
| 2006/0146081 | A1 | 7/2006 | Vandermeulen et al. |
| 2006/0165461 | A1 | 7/2006 | Vandermeulen et al. |
| 2006/0238600 | A1 | 10/2006 | Vandermeulen et al. |
| 2007/0009302 | A1 | 1/2007 | Vandermeulen |
| 2007/0172286 | A1 | 7/2007 | Pomfret |
| 2008/0080922 | A1 | 4/2008 | Vandermeulen |
| 2008/0084494 | A1 | 4/2008 | Pomfret |
| 2008/0298872 | A1 | 12/2008 | Kubota et al. |
| 2010/0166475 | A1 | 7/2010 | Yamaguchi et al. |
| 2010/0166477 | A1 | 7/2010 | Yamaguchi et al. |
| 2010/0166478 | A1 | 7/2010 | Yamaguchi et al. |
| 2010/0166479 | A1 | 7/2010 | Yamaguchi et al. |
| 2010/0166480 | A1 | 7/2010 | Yamaguchi et al. |
| 2010/0247205 | A1 | 9/2010 | Yamaguchi et al. |
| 2010/0247206 | A1 | 9/2010 | Yamaguchi et al. |
| 2010/0254742 | A1 | 10/2010 | Yamaguchi et al. |
| 2015/0283836 | A1 | 10/2015 | Sakano et al. |
| 2016/0114598 | A1 | 4/2016 | Kawakami et al. |
| 2016/0236495 | A1 | 8/2016 | Sakano et al. |
| 2016/0368275 | A1 | 12/2016 | Sakano et al. |
| 2016/0368294 | A1 | 12/2016 | Sakano et al. |
| 2018/0037043 | A1 | 2/2018 | Sakano et al. |
| 2019/0030935 | A1 | 1/2019 | Sakano et al. |
| 2020/0147988 | A1 | 5/2020 | Sakano et al. |
| 2022/0219468 | A1 | 7/2022 | Murayama |
| 2022/0219472 | A1 | 7/2022 | Higashi et al. |

FOREIGN PATENT DOCUMENTS

| | | | |
|---|---|---|---|
| CN | 1376115 | A | 10/2002 |
| CN | 1469811 | A | 1/2004 |
| CN | 1469812 | A | 1/2004 |
| CN | 1533332 | A | 9/2004 |
| CN | 1579796 | A | 2/2005 |
| CN | 101022956 | A | 8/2007 |
| CN | 101318415 | A | 12/2008 |
| CN | 101683790 | A | 3/2010 |
| CN | 102092201 | A | 6/2011 |
| CN | 103273748 | A | 9/2013 |
| CN | 203799182 | U | 8/2014 |
| CN | 105538907 | A | 5/2016 |
| CN | 106132712 | A | 11/2016 |
| EP | 0414544 | A2 | 2/1991 |
| GB | 2016411 | A | 9/1979 |
| JP | S49-12175 | B1 | 3/1974 |
| JP | S50-36734 | B1 | 11/1975 |
| JP | S54-111914 | A | 9/1979 |
| JP | S58-141479 | A | 8/1983 |
| JP | S59-6460 | A | 1/1984 |
| JP | S59-95180 | A | 6/1984 |
| JP | S60-8072 | U | 1/1985 |
| JP | S60-9657 | U | 1/1985 |
| JP | S60-24565 | U | 2/1985 |
| JP | S60-36255 | U | 3/1985 |
| JP | S60-46254 | U | 4/1985 |
| JP | S60-48456 | U | 4/1985 |
| JP | S60-188821 | A | 9/1985 |
| JP | S60-224571 | A | 11/1985 |
| JP | S61-154877 | A | 7/1986 |
| JP | S62-103179 | U | 5/1987 |
| JP | S63-156762 | U | 10/1988 |
| JP | H02-6173 | A | 1/1990 |
| JP | H02-9562 | U | 1/1990 |
| JP | H02-11379 | A | 1/1990 |
| JP | H02-11380 | A | 1/1990 |
| JP | H02-37568 | Y2 | 10/1990 |
| JP | H03-97181 | A | 4/1991 |
| JP | H03-284973 | A | 12/1991 |
| JP | H04-152176 | A | 5/1992 |
| JP | H05-41834 | U | 6/1993 |
| JP | H05-139006 | A | 6/1993 |
| JP | H05-53956 | A | 7/1993 |
| JP | H07-9745 | A | 1/1995 |
| JP | H07-32710 | A | 2/1995 |
| JP | H07-276755 | A | 10/1995 |
| JP | H07-276757 | A | 10/1995 |
| JP | H08-183204 | A | 7/1996 |
| JP | H08-183230 | A | 7/1996 |
| JP | H08-183232 | A | 7/1996 |
| JP | 2000-6504 | A | 1/2000 |
| JP | 2000-103149 | A | 4/2000 |
| JP | 2001-47713 | A | 2/2001 |
| JP | 2002-104717 | A | 4/2002 |
| JP | 2002-211092 | A | 7/2002 |
| JP | 2005-280060 | A | 10/2005 |
| JP | 2007-502221 | A | 2/2007 |
| JP | 2008-261968 | A | 10/2008 |
| JP | 2009-196804 | A | 9/2009 |

(56) References Cited

FOREIGN PATENT DOCUMENTS

| | | | |
|---|---|---|---|
| JP | 2011-46142 | A | 3/2011 |
| JP | 2011-098525 | A | 5/2011 |
| JP | 2011-148167 | A | 8/2011 |
| JP | 2011-150007 | A | 8/2011 |
| JP | 2011-207194 | A | 10/2011 |
| JP | 2012135931 | A | 7/2012 |
| JP | 2012-158175 | A | 8/2012 |
| JP | 2012-236307 | A | 12/2012 |
| JP | 2014-170142 | A | 9/2014 |
| JP | 2015-182318 | A | 10/2015 |
| JP | 2017-30333 | A | 2/2017 |
| WO | 2005/018944 | A1 | 3/2005 |
| WO | 2010125127 | A1 | 11/2010 |
| WO | 2021/065470 | A1 | 4/2021 |

OTHER PUBLICATIONS

International Preliminary Report on Patentability dated Apr. 5, 2022 and Written Opinion of the International Search Report for PCT/JP2020/034874 dated Nov. 2, 2020.

Extended European Search Report in corresponding European Patent Application No. 20870968.3 issued Aug. 14, 2023.

European Office Action for the related European Patent Application No. 20870968.3 dated Mar. 25, 2024.

Chinese Office Action for the related Chinese Patent Application No. 202080068302.6 dated Aug. 7, 2024.

Chinese Office Action for the related Chinese Patent Application No. 202080068302.6 dated Feb. 18, 2024.

Japanese Office Action for the related Japanese Patent Application No. 2023-121495 dated Jul. 23, 2024.

Chinese Office Action for the related Chinese Patent Application No. 202080068273.3 dated Feb. 7, 2024.

International Search Report for PCT/JP2020/034864 dated Nov. 17, 2020.

International Preliminary Report on Patentability dated Apr. 5, 2022 and Written Opinion of the International Search Report for PCT/JP2020/034864 dated Nov. 17, 2020.

The European Office Action for the related European Patent Application No. 20872473.2 dated Jun. 26, 2024.

Extended European Search Report for European Patent Application No. 20872473.2 dated Aug. 4, 2023.

International Preliminary Report on Patentability and English language Written Opinion of the International Search Report for PCT/JP2020/034869 dated Apr. 5, 2022.

International Search Report and Written Opinion of the International Search Report for PCT/JP2020/034869 dated Nov. 10, 2020.

Extended European Search Report issued in European Patent Application No. 20870694.5 dated Jul. 27, 2023.

Japanese Office Action for the related Japanese Patent Application No. 2023-121496 dated Aug. 27, 2024.

Chinese Office Action for Chinese Application No. 202080066599.2 dated Feb. 7, 2024.

* cited by examiner

PRINTING DEVICE, AND PRINTING CASSETTE INCLUDING CASE THAT HOUSES INPUT PART, OUTPUT PART, AND TRANSMISSION MECHANISM FOR TRANSMITTING DRIVE FORCE FROM INPUT PART TO OUTPUT PART

REFERENCE TO RELATED APPLICATIONS

This application is a continuation of U.S. patent application Ser. No. 17/694,214 filed Mar. 14, 2022, which is a by-pass continuation application of International Application No. PCT/JP2020/034869 filed Sep. 15, 2020 claiming priority from Japanese Patent Application No. 2019-178159 filed Sep. 30, 2019. The entire contents of the above-mentioned applications are incorporated herein by reference.

BACKGROUND ART

Background

In a device that performs printing or other processes on a tape, cassettes housing a tape are mounted in and removed from a device body to interchange and supply the tape. One cassette known for use in such devices includes a reel about which the tape is wound, and a gear provided on the reel.

Description

SUMMARY

In a case where a drive force is outputted from the cassette via the gear in the cassette described above, both an output part (i.e., the gear) and an input part (i.e., a hole in the reel) are formed in the reel. Consequently, there are limitations to the arrangement of the input position toward the inside of the cassette and the output position toward the outside of the cassette.

In order to attain the above and other object, according to an aspect, it is an object of the present disclosure to provide a printing device and a printing cassette that can enhance flexibility in the arrangement of an input position for inputting a drive force into the cassette and an output position for outputting the drive force from the cassette.

According to one aspect, the disclosure provides a printing device including: a printing cassette including a print tape; a platen roller configured to convey the print tape; and a drive source.

The printing cassette includes: an input part into which a drive force is configured to be inputted; an output part rotatable about a rotational axis parallel to a first direction and configured to transmit the drive force to the platen roller; a transmission mechanism drivingly connected to the input part and the output part and configured to transmit the drive force inputted into the input part to the output part; and a case that houses therein at least a part of the print tape, at least a part of the input part, at least a part of the output part, and at least part of the transmission mechanism.

At least a part of the output part is positioned outside the case. The output part is positioned inside an outer edge of the case in a projection view where the output part and the case are projected onto a plane perpendicular to the first direction.

According to another aspect, the disclosure provides a printing cassette including: a print tape; an input part into which a drive force is configured to be inputted; an output part rotatable about a rotational axis parallel to a first direction and configured to output the drive force for conveying the print tape to an outside; a transmission mechanism drivingly connected to the input part and the output part and configured to transmit the drive force inputted into the input part to the output part; and a case that houses therein at least a part of the print tape, at least a part of the input part, at least a part of the output part, and at least part of the transmission mechanism.

At least a part of the output part is positioned outside the case. The output part is positioned inside an outer edge of the case in a projection view where the output part and the case are projected onto a plane perpendicular to the first direction.

With this configuration, since the drive force can be transmitted from the input part to the output part by the transmission mechanism, the input part and the output part can be arranged respectively at arbitral locations. As a result, the degree of freedom in the arrangement of the input position for inputting the drive force into the printing cassette and the output position for outputting the drive force from the printing cassette can be enhanced. Further, protection can be provided for the output part, since the output part is positioned inside the outer edge of the case in the projection view.

According to still another aspect, the disclosure provides a printing cassette including: a print tape; an input part into which a drive force is configured to be inputted; an output part rotatable about a rotational axis parallel to a first direction and configured to output the drive force for conveying the print tape to an outside; a transmission mechanism drivingly connected to the input part and the output part and configured to transmit the drive force inputted into the input part to the output part; and a case that houses therein at least a part of the print tape, at least a part of the input part, at least a part of the output part, and at least part of the transmission mechanism.

At least a part of the output part is positioned outside the case. An entirety of the output part overlaps the case in the first direction.

With this configuration, since the drive force can be transmitted from the input part to the output part by the transmission mechanism, the input part and the output part can be arranged respectively at arbitral locations. Further, protection can be provided for the output part, since an entirety of the output part overlaps the case in the first direction.

According to still another aspect, the disclosure provides a printing cassette including: a print tape; an input part into which a drive force is configured to be inputted; an output part rotatable about a rotational axis parallel to a first direction and configured to output the drive force for conveying the print tape to an outside; a transmission mechanism drivingly connected to the input part and the output part and configured to transmit the drive force inputted into the input part to the output part; and a case that houses therein at least a part of the print tape, at least a part of the input part, at least a part of the output part, and at least part of the transmission mechanism.

The case has: a first surface and a second surface constituting respective endfaces of the case in a second direction perpendicular to the first direction; and a third surface and a fourth surface constituting respective endfaces of the case in a third direction perpendicular to the first direction and the second direction. The output part is positioned between the first surface and the second surface and between the third surface and the fourth surface.

With this configuration, since the drive force can be transmitted from the input part to the output part by the transmission mechanism, the input part and the output part can be arranged respectively at arbitral locations. Further, protection can be provided for the output part, since the output part is positioned between the first surface and the second surface and between the third surface and the fourth surface.

BRIEF DESCRIPTION OF THE DRAWINGS

The particular features and advantages of the embodiment (s) as well as other objects will become apparent from the following description taken in connection with the accompanying drawings, in which.

DETAILED DESCRIPTION

1. First Embodiment 1-1. Structure

Figure 1A:
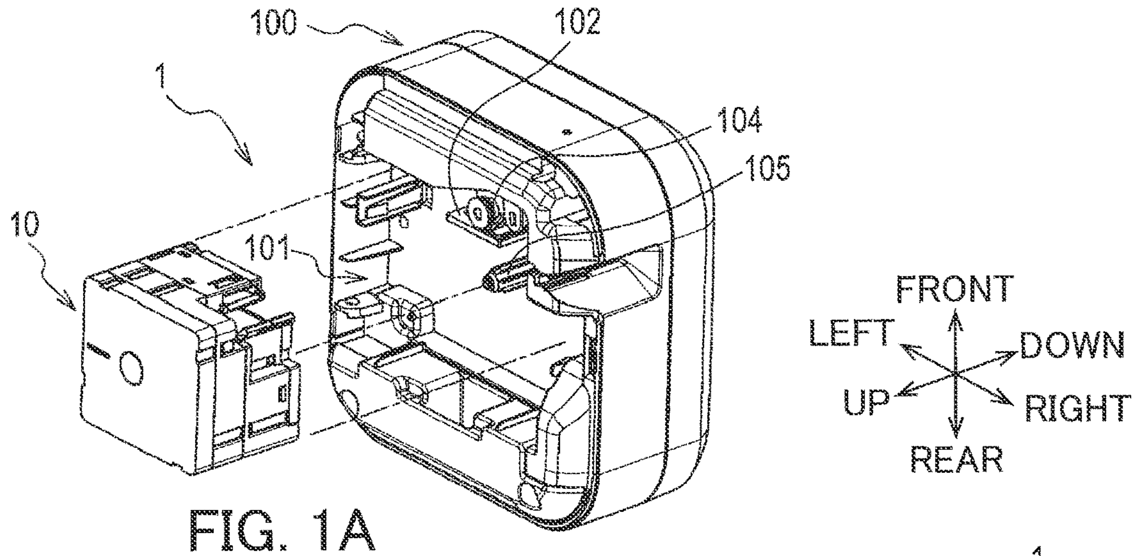
FIGS. 1A, 1B and 1C are schematic perspective views of a printing device according to a first embodiment and illustrating states where a printing cassette is removed from a device body.
Figure 1B:
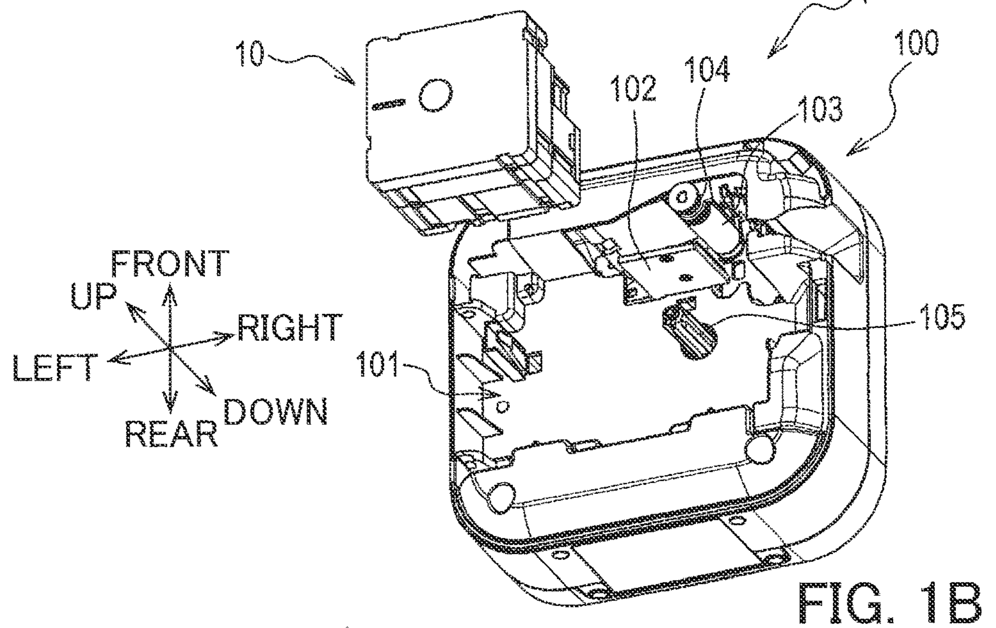
Figure 1C:
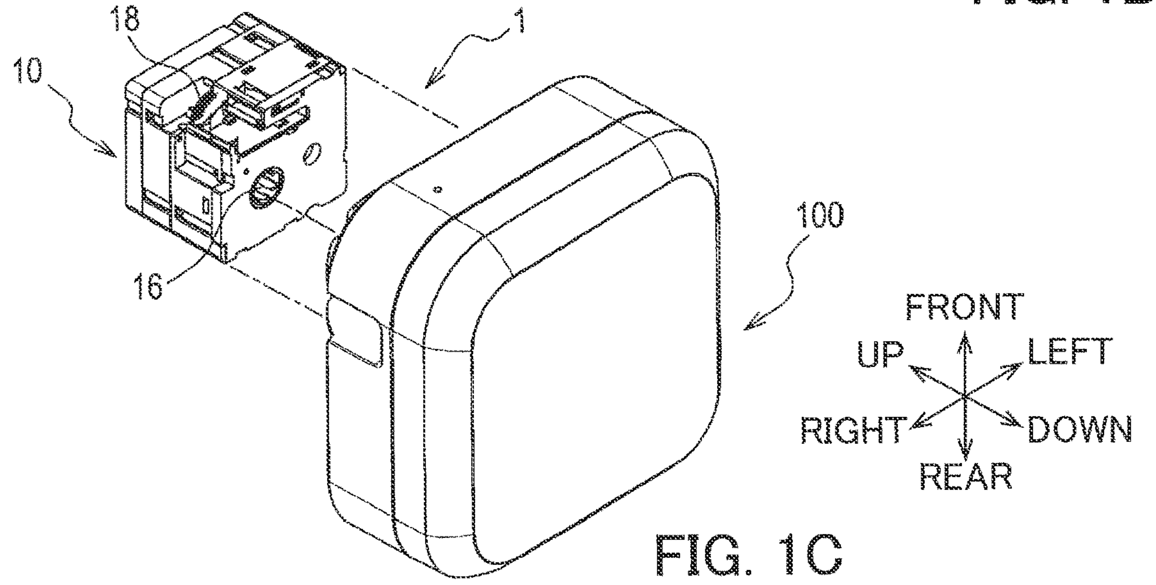

A printing device 1 illustrated in FIGS. 1A, 1B, and 1C includes a printing cassette 10, and a device body 100. The printing device 1 is a device configured to perform printing on a tape-like printing medium.

In the present embodiment, an axial direction of an output gear 18 will be defined as an up-down direction; a direction perpendicular to the up-down direction and in which the output gear 18 and an input spool 16 are aligned with each other will be defined as a front-rear direction; and a direction perpendicular to both the up-down direction and the front-rear direction will be defined as a left-right direction.

<Printing Cassette>

The printing cassette 10 houses a print medium therein. The printing cassette 10 is detachably mountable in the device body 100. Interchanging the printing cassettes 10 can result in replenishment of the printing medium and change in the type of print medium (such as color, material, and the like).

Figures 2A, 2B, 2C:
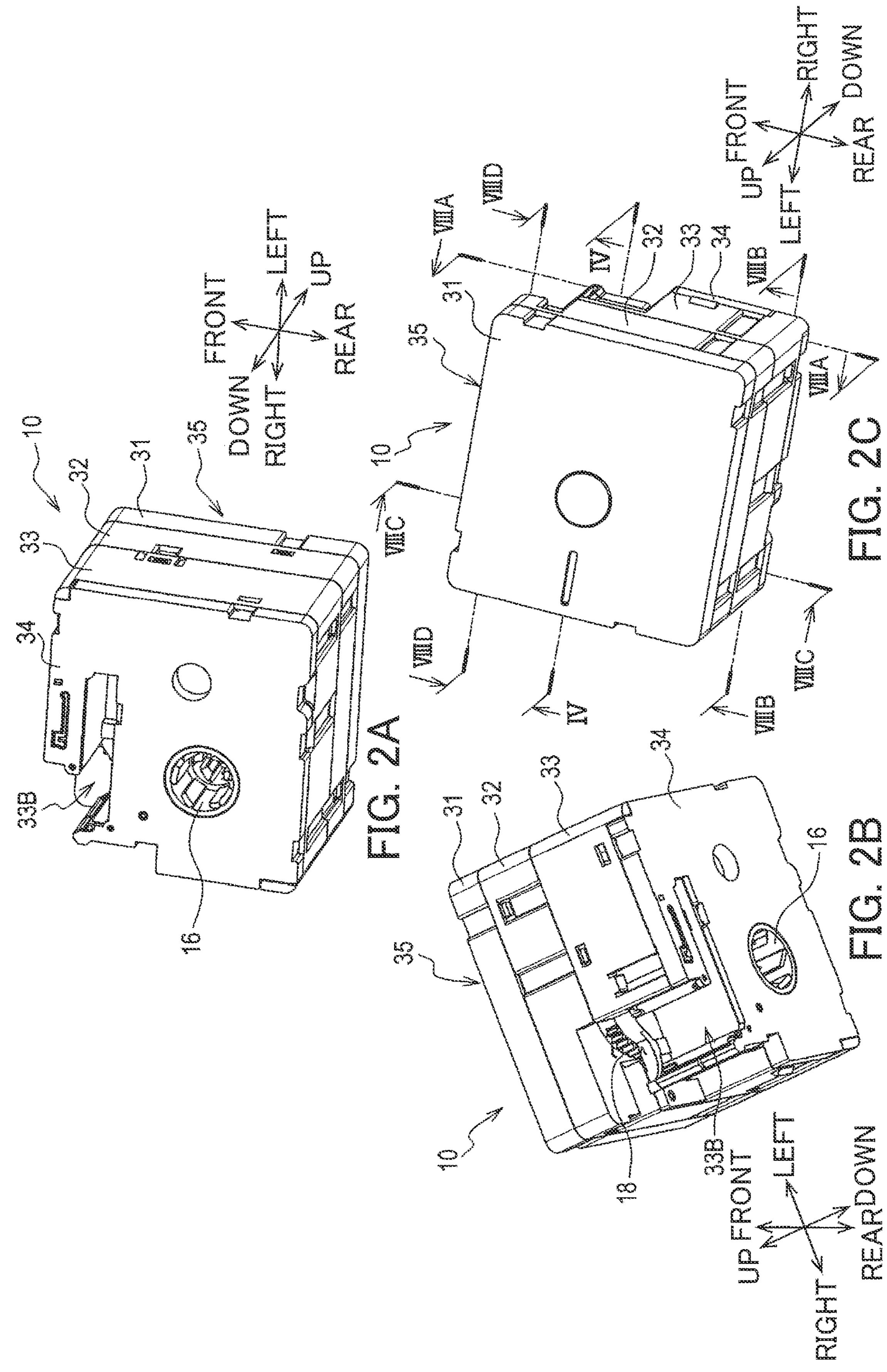
FIGS. 2A, 2B and 2C are schematic views of the printing cassette in the printing device of FIG. 1A.

As illustrated in FIGS. 2A, 2B, and 2C, the printing cassette 10 includes a case 35 that houses a print tape 11A, an ink ribbon 14A described later, and the like. The printing cassette 10 has an outer shape (i.e., a shape of the case 35) of a rectangular parallelepiped having sides that are parallel to each other in the up-down direction, sides that are parallel to each other in the front-rear direction, and sides that are parallel to each other in the left-right direction. The case 35 includes a first cover part 31, a first frame part 32, a second frame part 33, and a second cover part 34.

Figure 3:
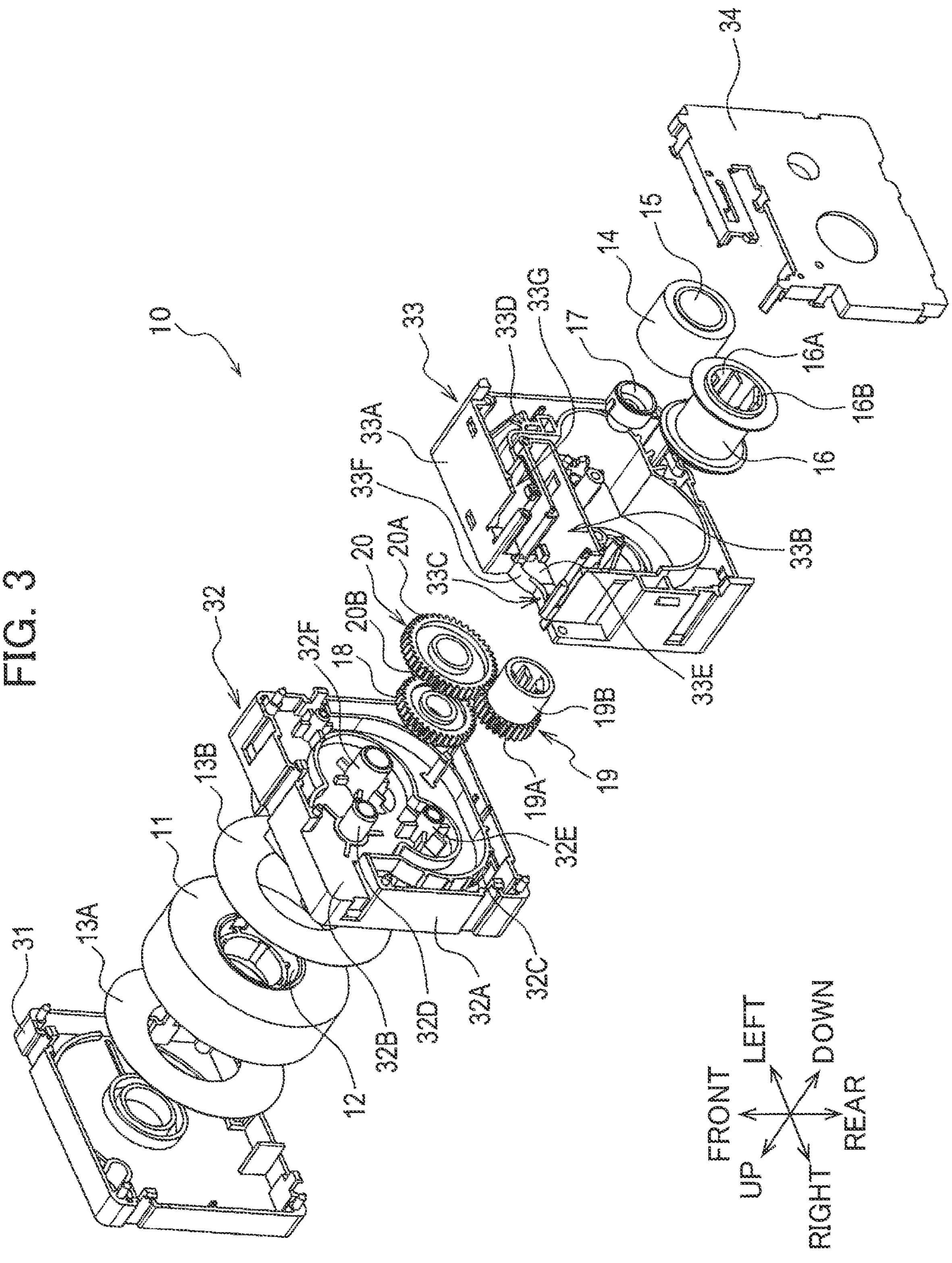
FIG. 3 is an exploded schematic perspective view of the printing cassette in the printing device of FIG. 2A.

As illustrated in FIG. 3, the printing cassette 10 includes a first roll 11, a first supply spool 12, spacer films 13A and 13B, a second roll 14, a second supply spool 15, the input spool 16, a clutch spring holder 17, the output gear 18, an input gear 19, and an idle gear 20.

(First Roll)

The first roll 11 is configured by winding the print tape 11A for printing over the first supply spool 12. On a front surface of the print tape 11A, printing is performed by a print head 102 provided in the device body 100 with the ink ribbon 14A.

On both outer sides of the first roll 11 in the up-down direction, the two spacer films 13A and 13B are disposed so as to sandwich the first roll 11 therebetween. The spacer films 13A and 13B are disposed between the first roll 11 and first cover part 31, and between the first roll 11 and first frame part 32, respectively.

(First Supply Spool)

The first supply spool 12 is rotatable about a rotational axis. The first supply spool 12 is configured to rotate as a platen roller 103 described later of the device body 100 conveys the print tape 11A, thereby supplying the print tape 11A to the print head 102.

(Second Roll)

The second roll 14 is configured by winding the ink ribbon 14A to be used for printing over the second supply spool 15.

The ink ribbon 14A is overlaid on the print tape 11A at a head opening 33B described later and subjected to printing by the print head 102. The ink ribbon 14A, which was used in the printing, is configured to be taken up by the input spool 16 described later. Further, a clutch spring retained in the clutch spring holder 17 applies a rotational resistance to the second roll 14.

(Second Supply Spool)

The second supply spool 15 is rotatable about a rotational axis. The rotational axis of the second supply spool 15 is parallel to the rotational axis of the first supply spool 12, i.e., to the up-down direction.

The second supply spool 15 is configured to rotate as the input spool 16 takes up the ink ribbon 14A, thereby supplying the ink ribbon 14A to the print head 102. Further, at least a part of the second supply spool 15 is arranged in a position overlapping with the first roll 11 in the up-down direction.

(Input Spool)

The input spool 16 is rotatable about a rotational axis. The rotational axis of the input spool 16 is parallel to the rotational axis of the second supply spool 15.

The input spool 16 is cylindrical and has a hollow part therein defined by an inner peripheral surface 16A thereof. On the inner peripheral surface 16A of the input spool 16, splines 16B are formed. A drive shaft 105 described later of the device body 100 is configured to be coupled with the splines 16B. The input spool 16 is configured to take up the ink ribbon 14A when rotated by the drive shaft 105.

(Output Gear)

The output gear 18 is a gear for externally outputting a drive force for conveying the print tape 11A. The output gear 18 is an output part configured to transmit the drive force to the platen roller 103 via a platen gear 104 described later of the device body 100.

The output gear 18 has a disc rotatable about a rotational axis, and teeth formed on a surface of the disc parallel to the up-down direction. One surface of the disc perpendicular to the up-down direction (i.e., a top surface) faces a cover part 32B described later of the case 35 in the up-down direction. Another surface of the disc perpendicular to the up-down direction (i.e., a bottom surface) has a portion that does not face the case 35 in the up-down direction.

Apart of the output gear 18 is exposed in the head opening 33B and is positioned outside the case 35. In a state where the printing cassette 10 is mounted in the device body 100, the output gear 18 engages the platen gear 104 at the head opening 33B.

Figure 4:
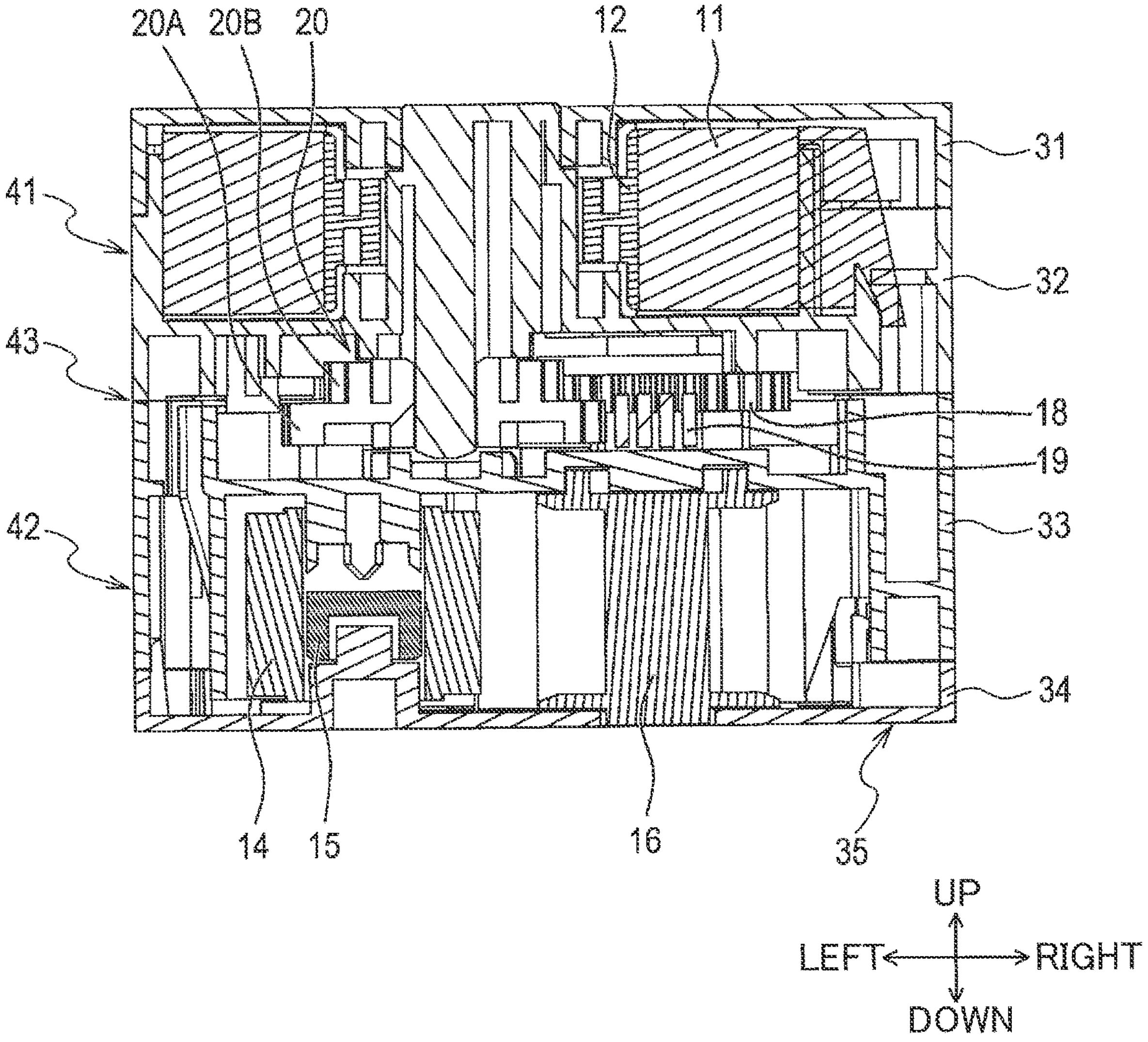
FIG. 4 is a schematic cross-sectional view of the printing cassette taken along a line IV-IV illustrated in FIG. 2C.

As illustrated in FIG. 4, the first roll 11, output gear 18, and second roll 14 (i.e., the second supply spool 15) are juxtaposed in the up-down direction in the order of the first roll 11, output gear 18, and second roll 14. That is, the output gear 18 is positioned between the first roll 11 and the second roll 14 in the up-down direction.

(Input Gear)

As illustrated in FIG. 3, the input gear 19 is a gear that engages the output gear 18 indirectly via the idle gear 20 described later for transmitting the drive force to the output gear 18. The drive force from a drive source in the device body 100 is configured to be inputted into the input gear 19.

The input gear 19 has a gear 19A, and a cylindrical spool 19B fixed to a bottom surface of the gear 19A. Splines are formed on an inner peripheral surface of the spool 19B. The gear 19A is rotatable together with the spool 19B by the drive force inputted into the spool 19B.

The rotational axis of the input gear 19 (i.e., the rotational axis of the gear 19A and the spool 19B) is arranged coaxially with the rotational axis of the input spool 16. As illustrated in FIG. 4, the input spool 16, input gear 19, and first roll 11 are juxtaposed in the up-down direction in the order of the input spool 16, input gear 19, and first roll 11.

That is, the input gear 19 is positioned between the input spool 16 and the first roll 11 in the up-down direction. Further, at least a part of the input gear 19 is disposed at a position overlapping with the first roll 11 in the up-down direction.

The rotational axis of the input gear 19 passes through the hollow part of the input spool 16. That is, the drive shaft 105 is inserted simultaneously through the input spool 16 and the input gear 19. As a result, the input gear 19 can be rotated by the drive source common to the input spool 16 (i.e., the drive shaft 105), although the input gear 19 is not directly coupled to the input spool 16.

(Idle Gear)

The idle gear 20 is drivingly coupled to (i.e., engaged with) the input gear 19 and the output gear 18. The idle gear 20 thus constitutes a transmission mechanism for transmitting the drive force inputted into the input gear 19 to the output gear 18.

The idle gear 20 is a two-stage gear configured of a first gear 20A and a second gear 20B coaxially juxtaposed with each other. The first gear 20A is in engagement with the input gear 19, and the second gear 20B is in engagement with the output gear 18. The second gear 20B has a diameter smaller than a diameter of the first gear 20A. Further, the second gear 20B is arranged closer to the first roll 11 (i.e., upward) than the first gear 20A is to the first roll 11 in the up-down direction. The idle gear 20 constitutes a deceleration mechanism for decelerating the drive force inputted into the input gear 19.

(Case)

As illustrated in FIG. 3, the first cover part 31 constitutes a top portion of the printing cassette 10. The first frame part 32 is disposed below the first cover part 31 and is connected to the first cover part 31 in the up-down direction. The second frame part 33 is disposed below the first frame part 32 and is connected to the first frame part 32 in the up-down direction. The second cover part 34 constitutes a bottom portion of the printing cassette 10. The second cover part 34 is connected to the second frame part 33 in the up-down direction.

The first cover part 31 and the first frame part 32 together constitute a first case part 41 (see FIG. 4) that accommodates the first roll 11 therein. In other words, the first roll 11 is disposed in a space enclosed by the first cover part 31 and the first frame part 32.

The second cover part 34 and the second frame part 33 together constitute a second case part 42 (see FIG. 4) that accommodates the second roll 14, the second supply spool 15, and the input spool 16. In other words, the second roll 14, the second supply spool 15, and the input spool 16 are disposed in a space enclosed by the second cover part 34 and the second frame part 33.

The first frame part 32 and the second frame part 33 together constitute a third case part 43 (see FIG. 4) in which a part of the output gear 18, the input gear 19 and the idle gear 20 are disposed. In other words, a part of the output gear 18, the input gear 19, and the idle gear 20 are disposed in a space enclosed by the first frame part 32 and the second frame part 33. The third case part 43 is arranged between the first case part 41 and the second case part 42 in the up-down direction.

The first frame part 32 has a first side wall 32A, the cover part 32B, a first guide 32C, a first gear support part 32D, a second gear support part 32E, and a third gear support part 32F. The first side wall 32A constitutes a peripheral surface of the first frame part 32 in parallel to the up-down direction of the printing cassette 10. The cover part 32B is a portion having a surface perpendicular to the up-down direction.

The cover part 32B is disposed at a position overlapping with the output gear 18 in the up-down direction. In the present embodiment, the cover part 32B is continuous with a bottom edge of the first side wall 32A and is arranged in a right-front corner portion of the first frame part 32.

The output gear 18, the cover part 32B, and the first roll 11 are juxtaposed in the up-down direction in the order of the output gear 18, the cover part 32B, and the first roll 11. Further, as described above, an entire area on a top surface of the output gear 18 is covered by the cover part 32B.

Figure 5:
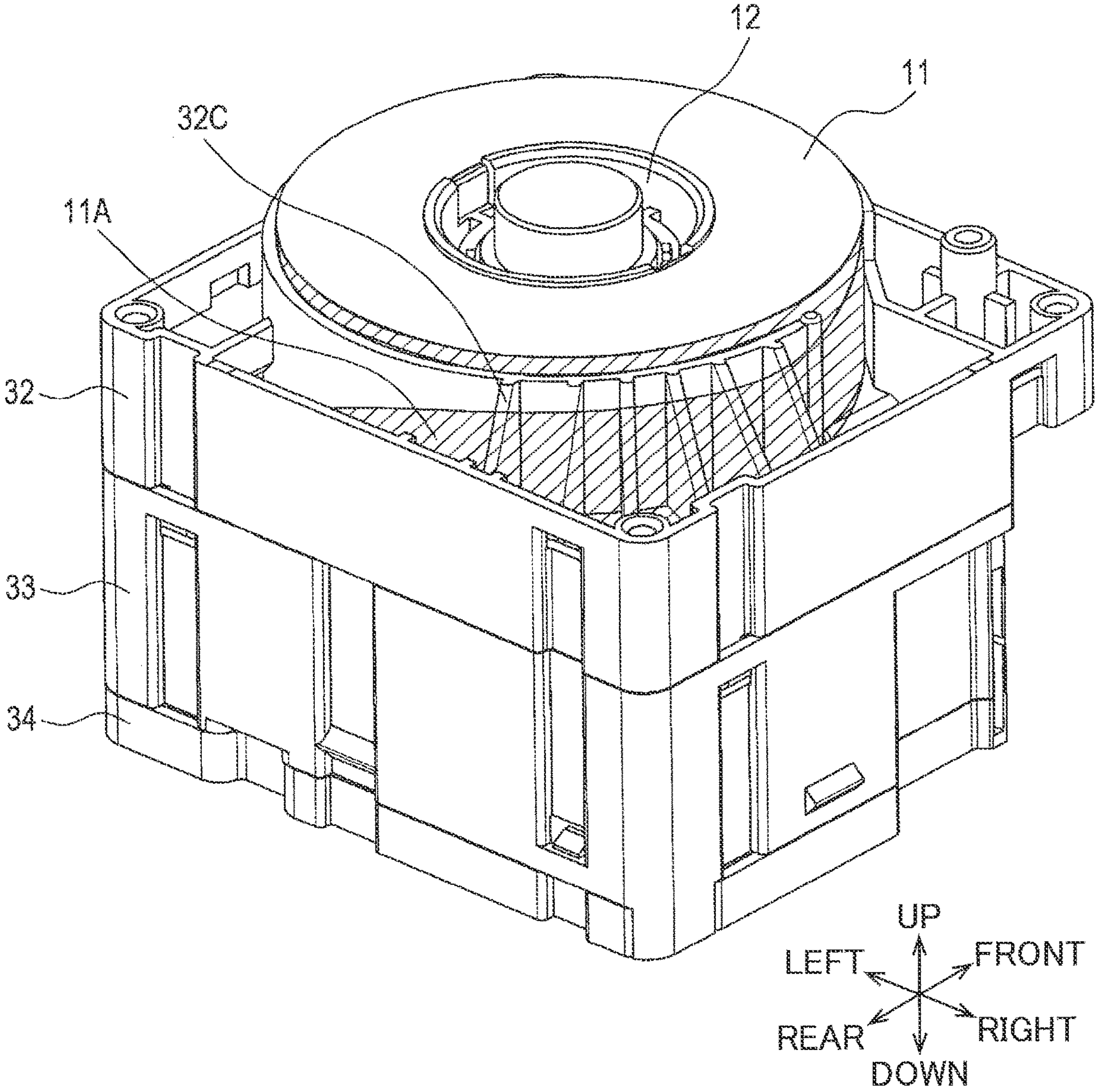
FIG. 5 is a schematic perspective view illustrating a state where a first cover part is removed in the printing cassette of FIG. 2A.

As illustrated in FIG. 5, the first guide 32C is a part over which the print tape 11A paid off the first roll 11 is wound. The first guide 32C has a plurality of plate-shaped ribs arranged at intervals along a circumferential direction of the first roll 11. The ribs protrude each in a radial direction of the first roll 11, and each rib has a protruding amount (i.e., a plate width) that becomes greater toward the bottom.

The first gear support part 32D illustrated in FIG. 3 rotatably supports the output gear 18. The second gear support part 32E rotatably supports the input gear 19. The third gear support part 32F rotatably supports the idle gear 20.

The second frame part 33 has a second side wall 33A, the head opening 33B, a discharge opening 33C, a second guide 33D, a protruding part 33E, and a conveying path 33G. The second side wall 33A constitutes a peripheral surface parallel to the up-down direction of the printing cassette 10.

The head opening 33B is a notched part provided by cutting a portion of the second side wall 33A off therefrom. The head opening 33B is a space in which the print head 102 is inserted from below upon attachment of the printing cassette 10 to the device body 100, such that the print head 102 is positioned inside the head opening 33B. The head opening 33B is open on the bottom of the printing cassette 10.

The second guide 33D is a part over which the print tape 11A, which moved past the first guide 32C, is wound. As with the first guide 32C, the second guide 33D has a plurality of plate-shaped ribs arranged at intervals along a circumferential direction of the second roll 14. The ribs protrude each in a radial direction of the second roll 14, and each rib has a protruding amount (i.e., a plate width) that becomes smaller toward the bottom.

The protruding part 33E is arranged at a position overlapping with the output gear 18 in the up-down direction. The protruding part 33E has an endface 33F that is parallel to the up-down direction. The protruding part 33E is positioned below the output gear 18 (i.e., opposite the cover part 32B with respect to the output gear 18).

The conveying path 33G is positioned upstream of the head opening 33B in a conveying direction of the print tape 11A. The print tape 11A and the ink ribbon 14A are configured to be conveyed in parallel to each other along the conveying path 33G. In the present embodiment, the conveying direction of the print tape 11A in the conveying path 33G is a direction from the left toward the right. In the conveying path 33G, the conveying direction is parallel to a straight line connecting a plurality of support points in contact with a back surface of the print tape 11A opposite its printing surface.

A portion of the input gear 19 overlaps the output gear 18 in a direction orthogonal to both the conveying direction of the print tape 11A at the conveying path 33G (i.e., the left-right direction) and the up-down direction. That is, the said portion of the input gear 19 overlaps the output gear 18 in the front-rear direction.

Figure 6:
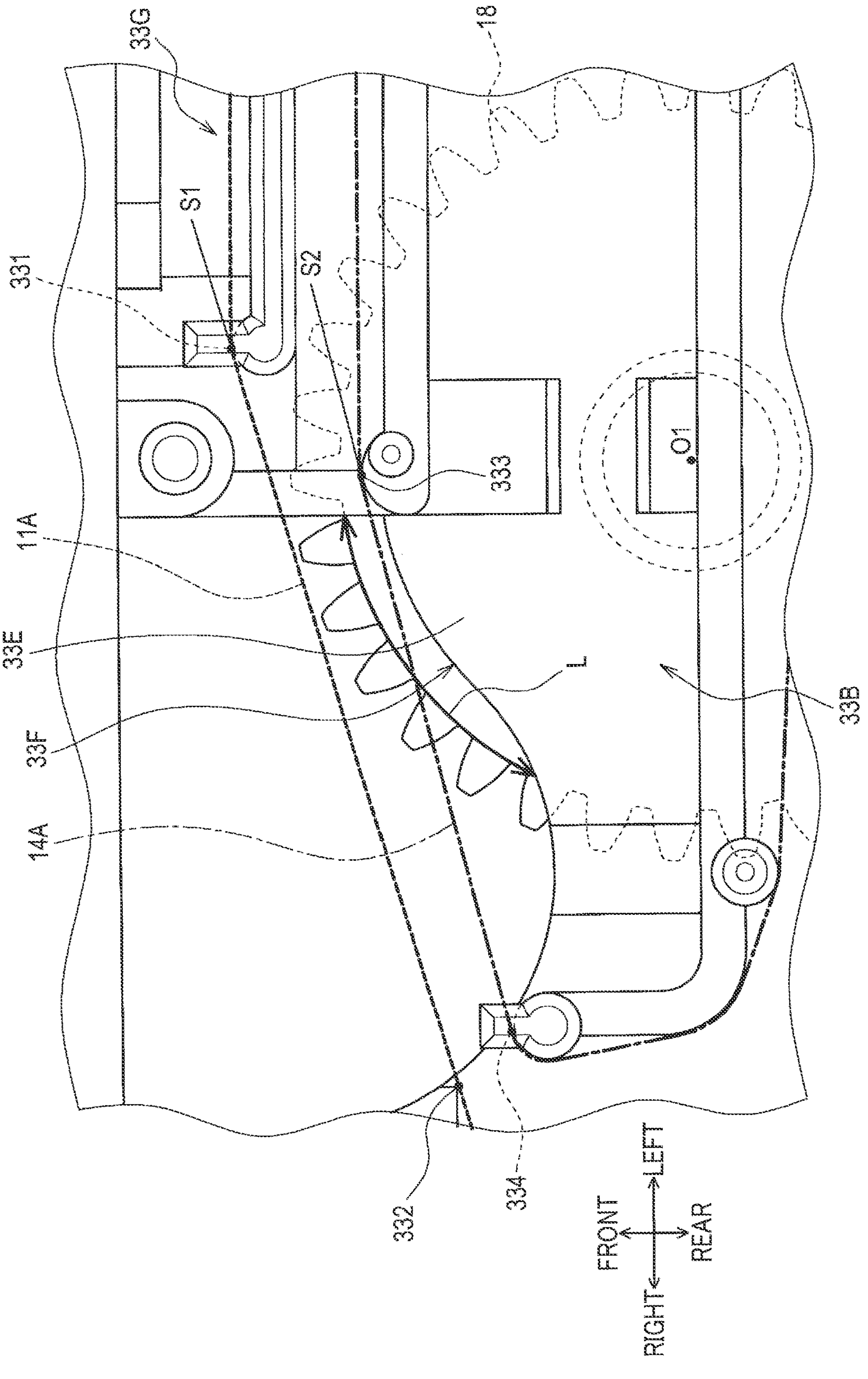
FIG. 6 is an enlarged plan view schematically illustrating a head opening and in the vicinity thereof in the printing cassette of FIG. 2A.

As illustrated in FIG. 6, the print tape 11A and the ink ribbon 14A are arranged to extend in the left-right direction through the head opening 33B. After printing is performed, the print tape 11A is discharged out of the printing device 1 through the discharge opening 33C.

In a projection view where the output gear 18 and the case 35 are projected onto a datum plane perpendicular to the up-down direction, the output gear 18 is positioned inside an outer edge of the case 35. Further, an entirety of the output gear 18 overlaps the case 35 in the up-down direction.

A part of the output gear 18 overlaps the head opening 33B in the up-down direction. In particular, a rotational axis O1 of the output gear 18 passes through the head opening 33B. Further, the endface 33F of the protruding part 33E is positioned between a dedendum circle of the output gear 18 and the rotational axis O1 of the output gear 18.

A portion of the output gear 18 positioned outside the case 35 (i.e., a portion that does not overlap the protruding part 33E in the up-down direction) provides a circumferential length L along the dedendum circle of the entire output gear 18. With respect to the dedendum circle, the circumferential length L is equal to or greater than ⅛ of the entire circumference, and also equal to or smaller than ⅓ of the entire circumference.

The case 35 further includes: a first upstream support part 331 and a first downstream support part 332 for supporting the print tape 11A; and a second upstream support part 333 and a second downstream support part 334 for supporting the ink ribbon 14A.

The first upstream support part 331 is disposed adjacent to and upstream of the head opening 33B in the conveying direction of the print tape 11A. The first downstream support part 332 is disposed adjacent to and downstream of the head opening 33B in the conveying direction of the print tape 11A. The first downstream support part 332 is positioned rightward and rearward of the first upstream support part 331.

The second upstream support part 333 is disposed adjacent to and upstream of the head opening 33B in a conveying direction of the ink ribbon 14A. The second downstream support part 334 is disposed adjacent to and downstream of the head opening 33B in the conveying direction of the ink ribbon 14A. The second downstream support part 334 is positioned rightward and rearward of the second upstream support part 333.

A datum straight line S2 connecting the second upstream support part 333 and the second downstream support part 334 overlaps the output gear 18 in the up-down direction. On the other hand, a datum straight line S1 connecting the first upstream support part 331 and first downstream support part 332 does not overlap the output gear 18 in the up-down direction. Accordingly, the print tape 11A and the ink ribbon 14A are configured to be conveyed through the head opening 33B while being separated from each other in the front-rear direction. Further, the output gear 18 overlaps the second upstream support part 333 in the up-down direction.

Figure 7:
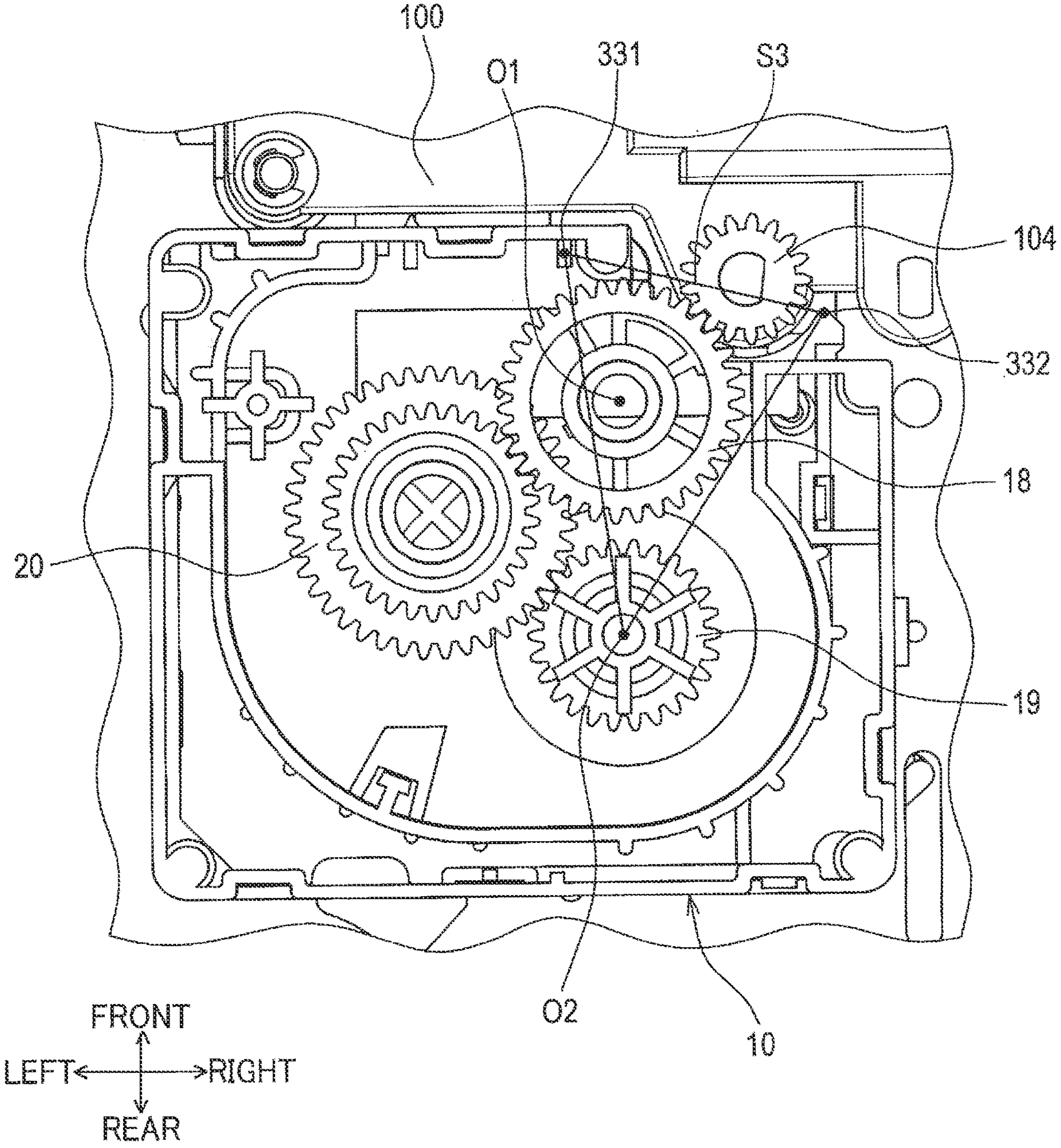
FIG. 7 is a schematic view illustrating an engagement state between an output gear and a platen gear in the printing device of FIG. 1A.

As illustrated in FIG. 7, a part of the output gear 18 overlaps a datum triangle S3 in the up-down direction, the datum triangle S3 connecting the first upstream support part 331, the first downstream support part 332, and a rotational axis O2 of the input gear 19. In particular, the rotational axis O1 of the output gear 18 passes through the datum triangle S3 in the present embodiment.

As illustrated in FIGS. 8A, 8B, 8C, and 8D, the first guide 32C and the second guide 33D constitute a path for conveying the print tape 11A forming the first roll 11 from the first case part 41 to the second case part 42.

Figure 8A:
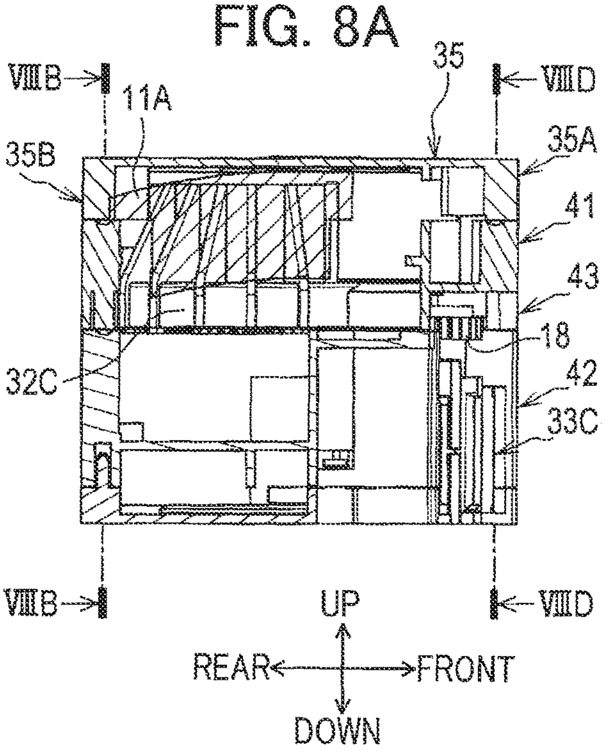
FIG. 8A is a schematic cross-sectional view of the printing cassette taken along a line VIIIA-VIIIA illustrated in FIG. 2C.
Figure 8B:
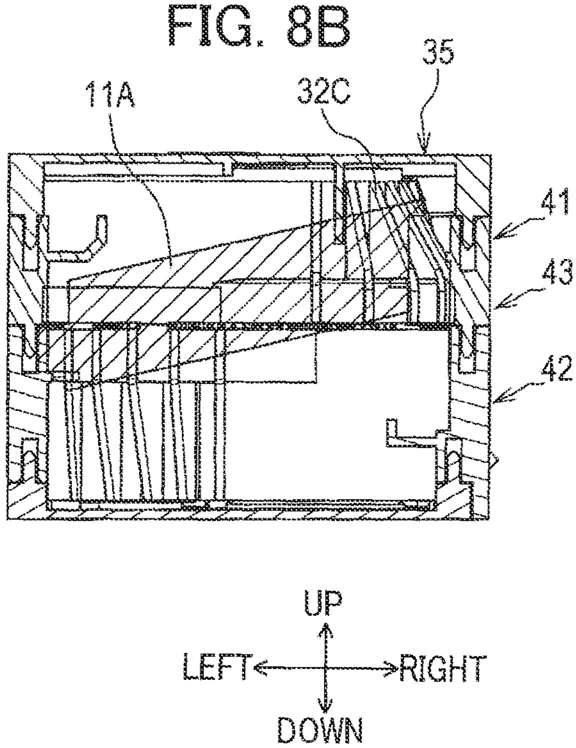
FIG. 8B is a schematic cross-sectional view of the printing cassette taken along a line VIIIB-VIIIB illustrated in FIG. 2C.

Specifically, as illustrated in FIG. 8A, the print tape 11A paid out from the first roll 11 is conveyed downward and rearward in a spiral manner inside the first case part 41 while making contact with the first guide 32C from its outside with respect to the radial direction of the first roll 11. The print tape 11A is then conveyed downward and leftward while passing the third case part 43 in the up-down direction, as illustrated in FIG. 8B.

Figure 8C:
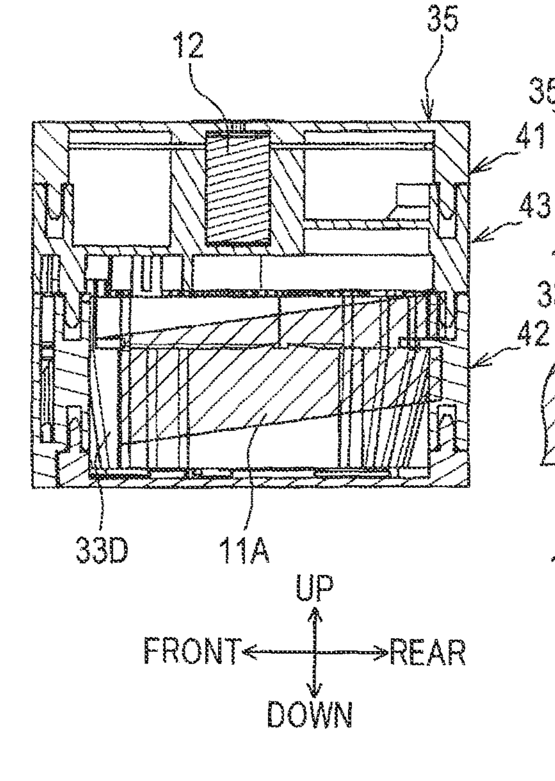
FIG. 8C is a schematic cross-sectional view of the printing cassette taken along a line VIIIC-VIIIC illustrated in FIG. 2C.
Figure 8D:
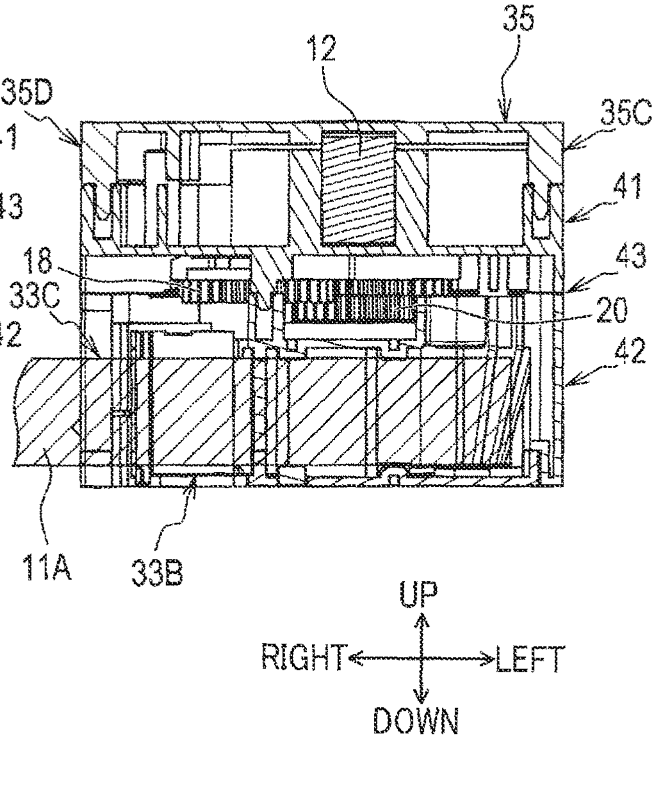
FIG. 8D is a schematic cross-sectional view of the printing cassette taken along a line VIIID-VIIID illustrated in FIG. 2C.

As illustrated in FIG. 8C, after arriving at the second case part 42, the print tape 11A is conveyed downward and frontward while making contact with the second guide 33D from its outside in the radial direction. When reaching the bottom of the printing cassette 10, the print tape 11A passes through the head opening 33B and is then discharged through the discharge opening 33C, as illustrated in FIG. 8D.

Further, as illustrated in FIG. 8A, the output gear 18 is positioned between a first surface 35A and a second surface 35B of the case 35. Further, as illustrated in FIG. 8D, the output gear 18 is positioned between a third surface 35C and a fourth surface 35D of the case 35.

The first surface 35A and the second surface 35B respectively constitute endfaces of the case 35 in the front-rear direction. Specifically, the first surface 35A is a frontmost surface, and the second surface 35B is ta rearmost surface. Further, the third surface 35C and fourth surface 35D respectively constitute endfaces of the case 35 in the left-right direction. Specifically, the third surface 35C is a leftmost surface, and the fourth surface 35D is a rightmost surface.

<Device Body>

As illustrated in FIG. 1B, the device body 100 includes a cassette insertion section 101, the print head 102, the platen roller 103, the platen gear 104, and the drive shaft 105.

(Cassette Insertion Section)

The cassette insertion section 101 is a recessed part in which the printing cassette 10 is configured to be mounted. The cassette insertion section 101 functions to provide positioning of the printing cassette 10.

(Print Head)

The print head 102 is a device for printing on the print tape 11A accommodated in the printing cassette 10.

The print head 102 is disposed inside the cassette insertion section 101. The print head 102 is disposed at a position in the head opening 33B overlapping with the print tape 11A and the ink ribbon 14A in the front-rear direction in a state where the printing cassette 10 is mounted in the device body 100.

The print head 102 includes a plurality of heating elements whose heating control is configured to be performed individually. The print tape 11A conveyed to the head opening 33B by the platen roller 103 described later is pressed against the print head 102 where the heating elements are heated through the ink ribbon 14A. Part of the ink provided on the front surface of the ink ribbon 14A is thus transferred onto the print tape 11A, by which characters, symbols, and the like are printed on the print tape 11A.

(Platen Roller)

The platen roller 103 is a roller for conveying the print tape 11A out of the printing cassette 10. The platen roller 103 has a rotational axis parallel to the up-down direction.

The platen roller 103 is disposed near the print head 102 inside the cassette insertion section 101. The platen roller 103 is configured to contact the print tape 11A and presses the print tape 11A against the print head 102 at the head opening 33B.

(Platen Gear)

The platen gear 104 is connected to the platen roller 103 and is engaged with the output gear 18. In the present embodiment, a rotational axis of the platen gear 104 is arranged coaxially with the rotational axis of the platen roller 103.

Figure 9:
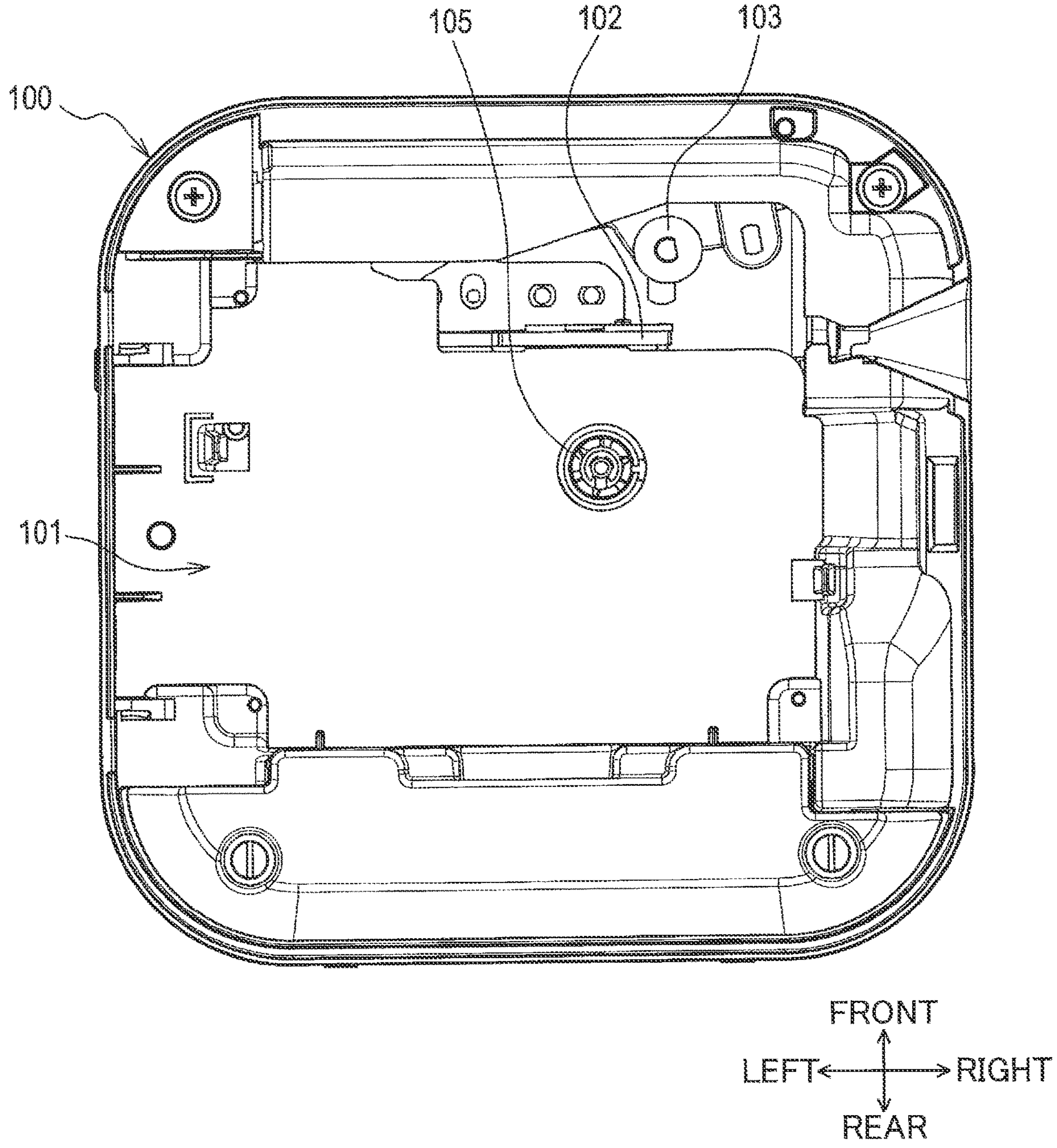
FIG. 9 is a schematic plan view of the device body of the printing device of FIG. 1A.

The platen roller 103 and the platen gear 104 are pivotably movable between a position separated from the printing cassette 10 as illustrated in FIG. 9, and a position where the platen gear 104 engages the output gear 18 as illustrated in FIG. 7.

(Drive Shaft)

The drive shaft 105 is a shaft which is inserted into the input spool 16 and engaged with the input gear 19 to rotate the input spool 16 and the input gear 19.

The drive shaft 105 is disposed inside the cassette insertion section 101. The drive shaft 105 has a rotational axis parallel to the up-down direction. The drive shaft 105 is configured to rotate about its rotational axis by a non-illustrated drive source (such as a motor).

As illustrated in FIG. 7, the drive shaft 105 engages the input gear 19, and the platen gear 104 engages the output gear 18 in the state where the printing cassette 10 is mounted in the device body 100. Specifically, the drive shaft 105 is inserted in the input spool 16 and the input gear 19 of the printing cassette 10, and the platen roller 103 and the platen gear 104 are pivotably moved toward the head opening 33B of the printing cassette 10, by which operation the printing cassette 10 is mounted in the device body 100.

The input gear 19 is rotated by the drive shaft 105 in the state where the printing cassette 10 is mounted, which in turn rotates the output gear 18. The platen gear 104 rotates by the rotation of the output gear 18, and the platen roller 103 rotates by the rotation of the platen gear 104.

1-2. Advantages

According to the present embodiment described above, the following advantages can be obtained.

(1a) Since the drive force can be transmitted from the input gear 19 to the output gear 18 by the idle gear 20, the input gear 19 and output gear 18 can be arranged at arbitral locations. As a result, the degree of freedom in the arrangement of the input position for inputting the drive force into the printing cassette 10 and the output position for outputting the drive force from the printing cassette 10 can be enhanced. Further, protection can be provided for the output gear 18, since the output gear 18 is positioned inside the outer edge of the case 35 in the projection view in the up-down direction.

(1b) Since the first roll 11, the output gear 18, and the second roll 14 are juxtaposed in the up-down direction in the order of the first roll 11, the output gear 18, and second roll 14, the output gear 18 is less likely to be damaged in a case where the printing cassette 10 is dropped and a surface of the printing cassette 10 perpendicular to the up-down direction collides on a floor or the like.

(1c) The portion of the output gear 18 positioned outside the case 35 provides the circumferential length L ranging from ⅛ to ⅓ of the entire circumference of the dedendum circle, and/or the endface 33F of the protruding part 33E is positioned between the dedendum circle of the output gear 18 and the rotational axis O1 of the output gear 18. With this structure, the output gear 18 can be protected while ensuring reliable engagement with the platen gear 104.

(1d) The datum straight line S2 connecting the second upstream support part 333 and the second downstream support part 334 overlaps the output gear 18 in the up-down direction. With this structure, interference between the platen roller 103 and the ink ribbon 14A can be avoided during mounting of the printing cassette 10.

(1e) A gap can be provided between the print tape 11A and the ink ribbon 14A in the head opening 33B. With this structure, in a case where one of the print tape 11A and ink ribbon 14A meanders or skews, adverse effect attributed to the skewed one on the conveyance of the other can be mitigated.

(1f) Due to the arrangement where a portion of the input gear 19 overlaps the output gear 18 in the front-rear direction and/or a portion of the output gear 18 overlaps the datum triangle S3, a region occupied by the input gear 19 and the output gear 18 in the left-right direction can be reduced. Accordingly, the printing cassette 10 can be downsized with respect to the left-right direction.

2. Second Embodiment

2-1. Structure

Figure 10A:
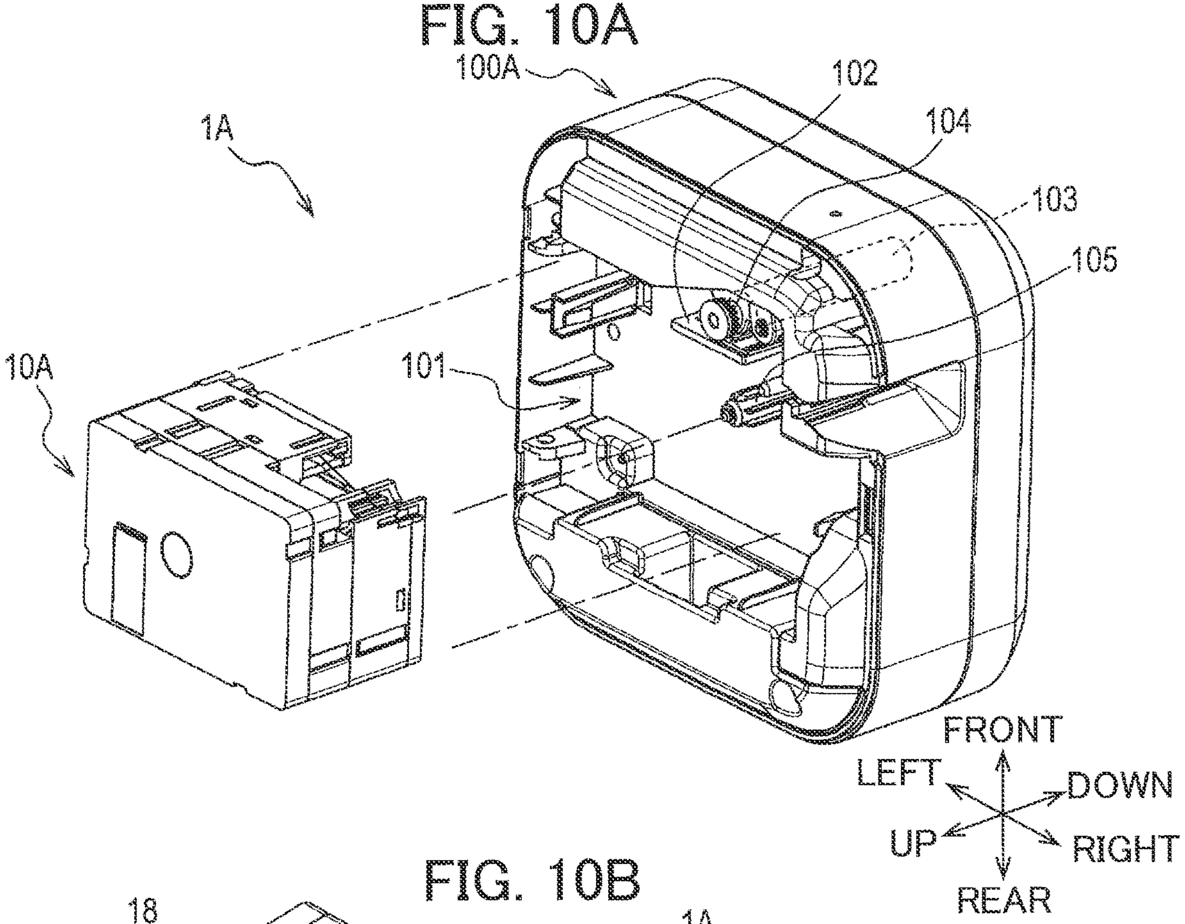
FIGS. 10A and 10B are schematic views of a printing device according to a second embodiment and illustrating states where a printing cassette is removed from a device body.
Figure 10B:
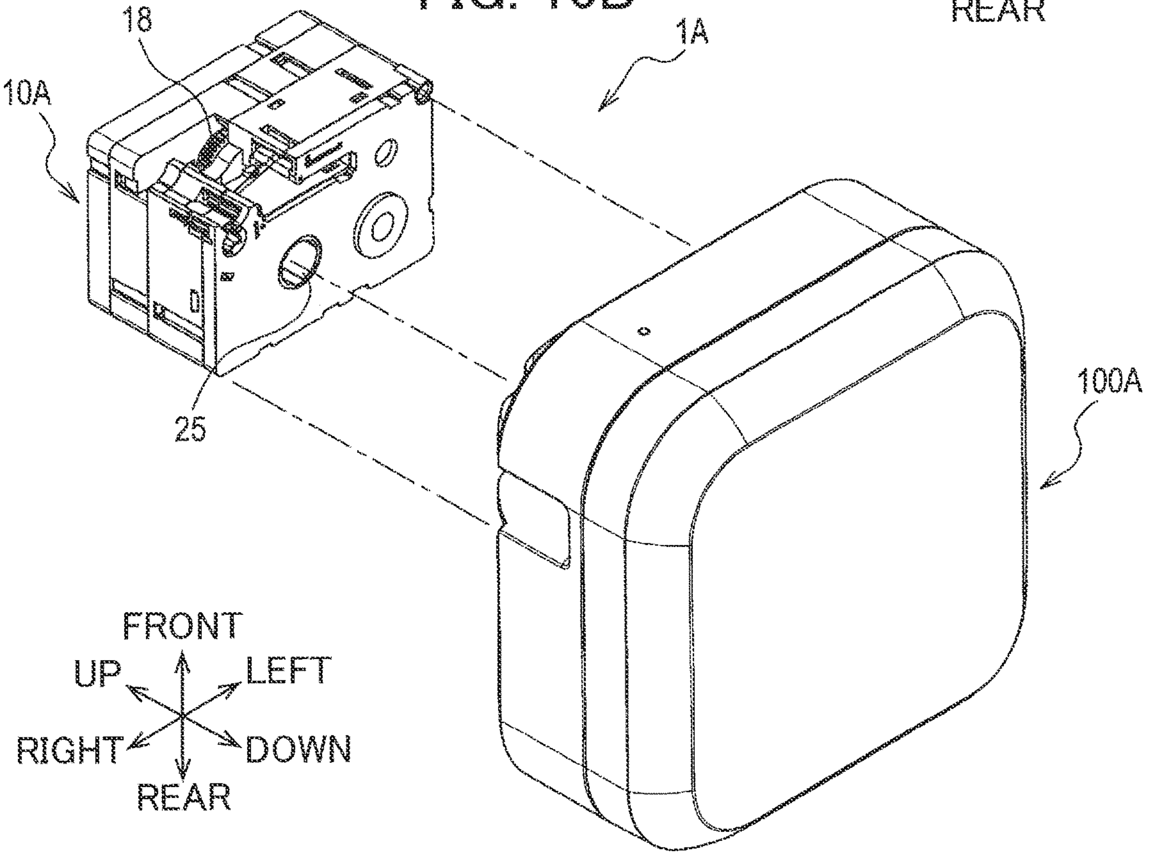

A printing device 1A illustrated in FIGS. 10A and 10B includes a printing cassette 10A, and a device body 100A.

<Printing Cassette>

Figure 11:
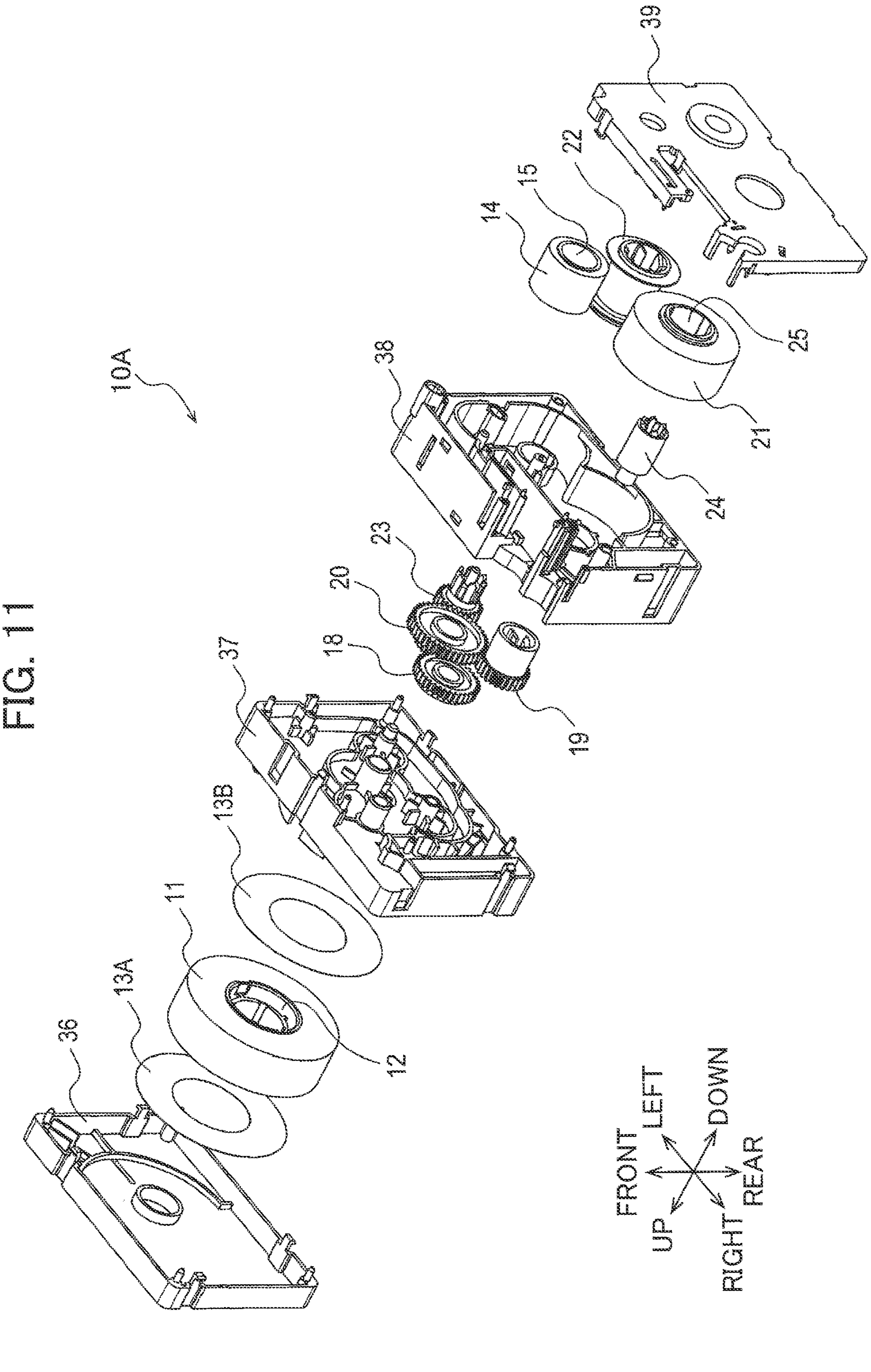
FIG. 11 is an exploded schematic perspective view of the printing cassette in the printing device of FIG. 10A.

The printing cassette 10A further includes a third roll 21, an additional spool 22, an additional gear 23, and a pinch roller 24 illustrated in FIG. 11, in addition to the printing cassette 10 according to the first embodiment. Further, in the printing cassette 10A, the input spool 16, the first cover part 31, the first frame part 32, the second frame part 33, and the second cover part 34 of the first embodiment are replaced with an input spool 25, a first cover part 36, a first frame part 37, a second frame part 38, and a second cover part 39, respectively.

The input spool 25 is identical to the input spool 16, except that the input spool 25 does not have the splines 16B. The first cover part 36, the first frame part 37, the second frame part 38, and the second cover part 39 respectively correspond to the first cover part 31, the first frame part 32, the second frame part 33, and the second cover part 34 which are respectively elongated in the left-right direction. The remaining structure of the printing cassette 10A is identical to that in the printing cassette 10 of the first embodiment, except for the points described below and, hence, description therefor will be omitted.

The third roll 21 is configured by winding a laminate tape for protecting the print tape 11A over the input spool 25. The laminate tape has an adhesive surface to be bonded to the print tape 11A after the print tape 11A has been printed by the print head 102.

The additional spool 22 is rotatable about a rotational axis. The rotational axis of the additional spool 22 is parallel to the rotational axis of the second supply spool 15 (i.e., the up-down direction). The additional spool 22 is a take-up spool configured to take up the ink ribbon 14A by the rotation of the additional gear 23 described later.

The additional gear 23 is connected to the additional spool 22 and engaged with the idle gear 20. The additional gear 23 is rotatable by the drive force inputted into the input gear 19, thereby rotating the additional spool 22.

The pinch roller 24 presses the laminate tape against the printed print tape 11A, together with a pressure roller 106 described later. The pinch roller 24 is disposed downstream of the head opening 33B in the conveying direction of the print tape 11A.

<Device Body>

Figure 12:
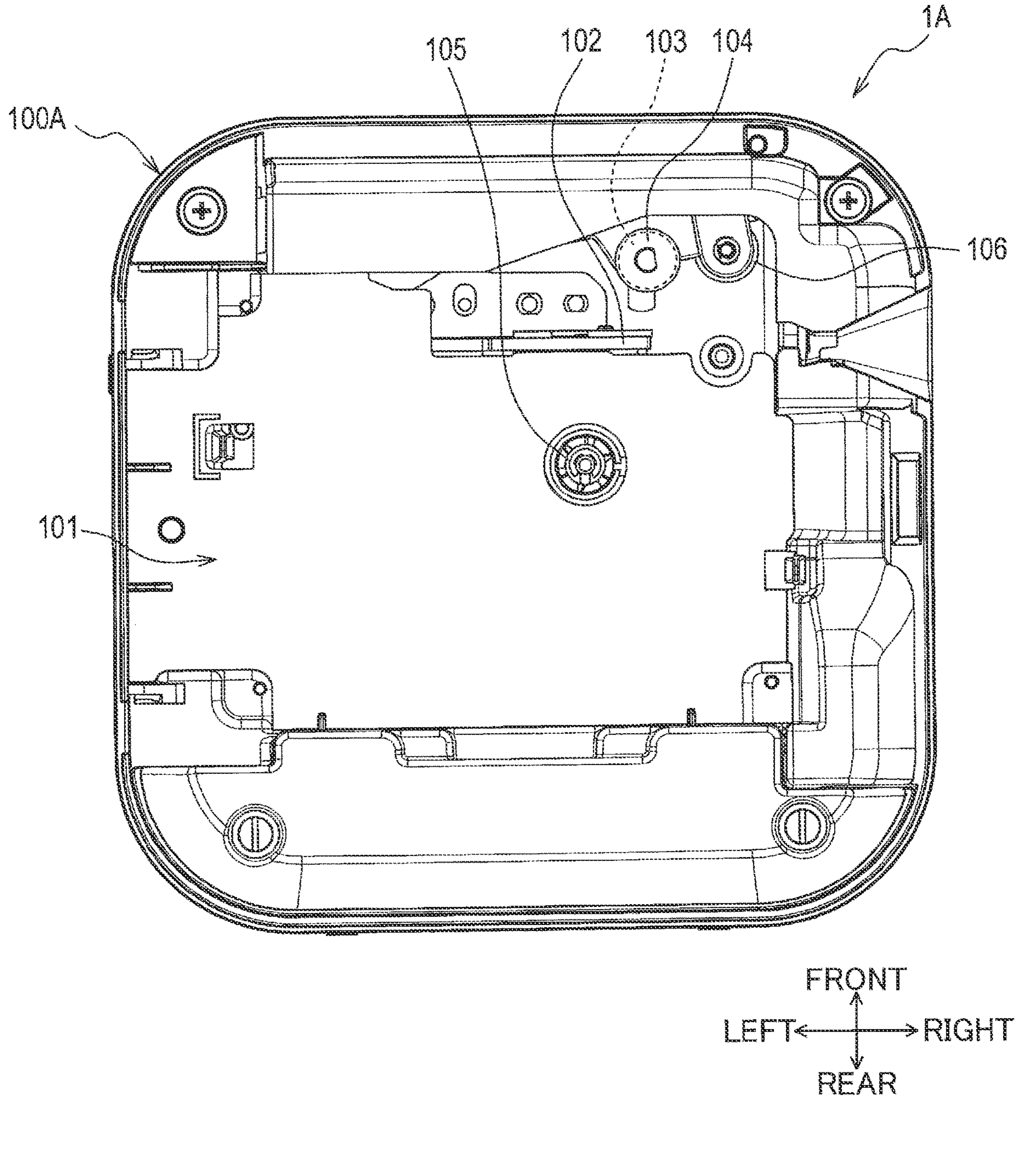
FIG. 12 is a schematic plan view of the device body of the printing device of FIG. 10A.

The device body 100A further includes the pressure roller 106 illustrated in FIG. 12, in addition to the device body 100 of the first embodiment. The remaining structure of the device body 100A is identical to that of the device body 100 according to the first embodiment, except for the points described below, and, hence, description therefor will be omitted.

Figure 13:
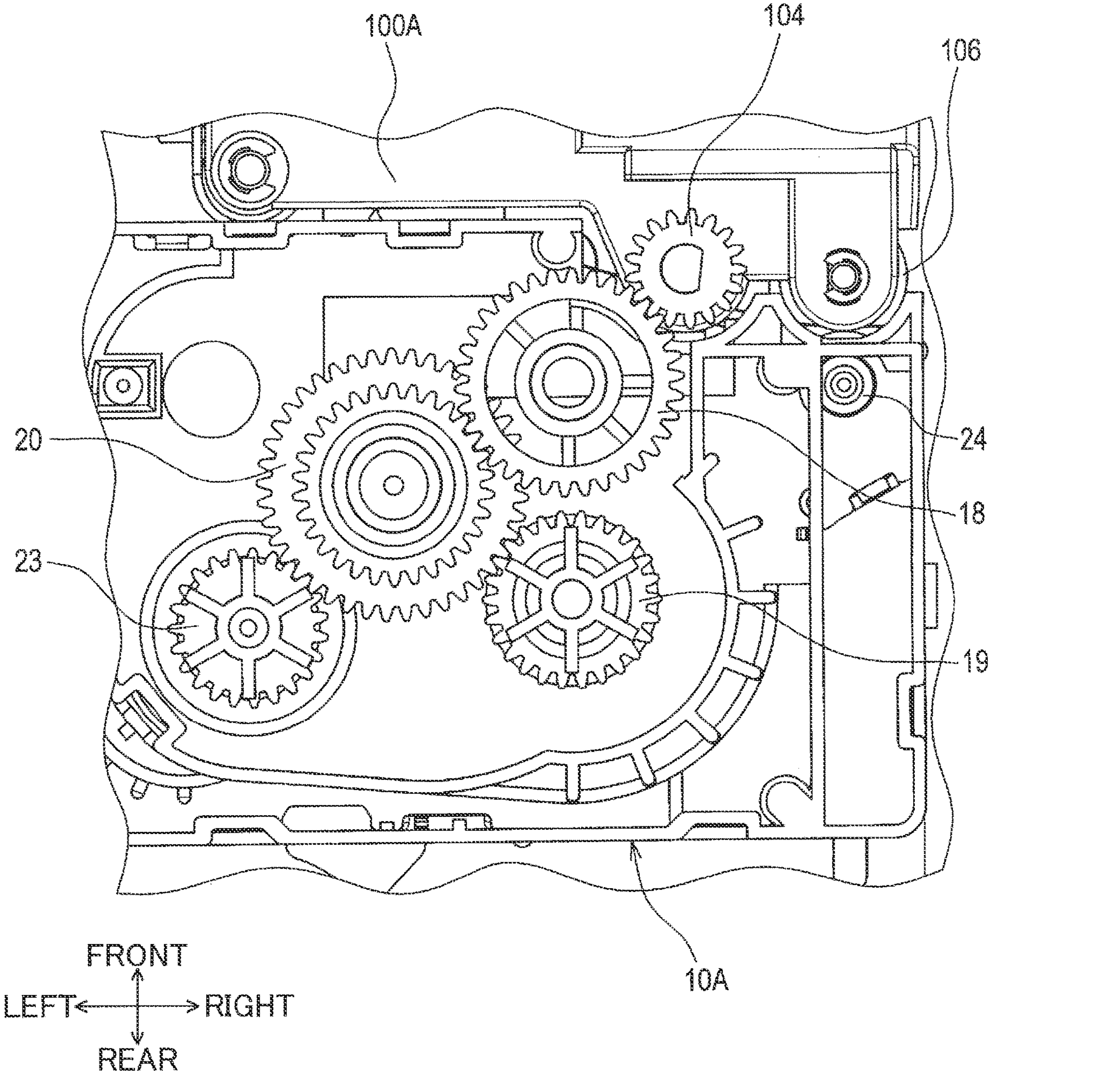
FIG. 13 is a schematic view illustrating an engagement state between an output gear and a platen gear in the printing device of FIG. 10A.

The pressure roller 106 is pivotably movable together with the platen roller 103 and the platen gear 104. That is, the pressure roller 106 is pivotable between a position separated from the printing cassette 10A as illustrated in FIG. 12, and a position for pressing the print tape 11A and the laminate tape against the pinch roller 24 as illustrated in FIG. 13.

2-2. Advantages

According to the embodiment described above, the following advantages can be obtained.

(2a) In addition to the same advantages obtained in the first embodiment, the printed content on the print tape 11A can be provided by the laminate tape.

3. Other Embodiments

While the description has been made with reference to the embodiments, it would be apparent that the present disclosure is not limited to the described embodiments and many modifications and variations may be made thereto.

(3a) The printing device according to the depicted embodiments is not limited to a device which uses an ink ribbon for printing. The printing device may perform printing using a strip-like thermal paper as the print tape. For example, the printing device may use a laminate tape (i.e., a protective tape) in place of the ink ribbon. Further, the printing cassette may not include the second roll and the second supply spool.

Figure 14:
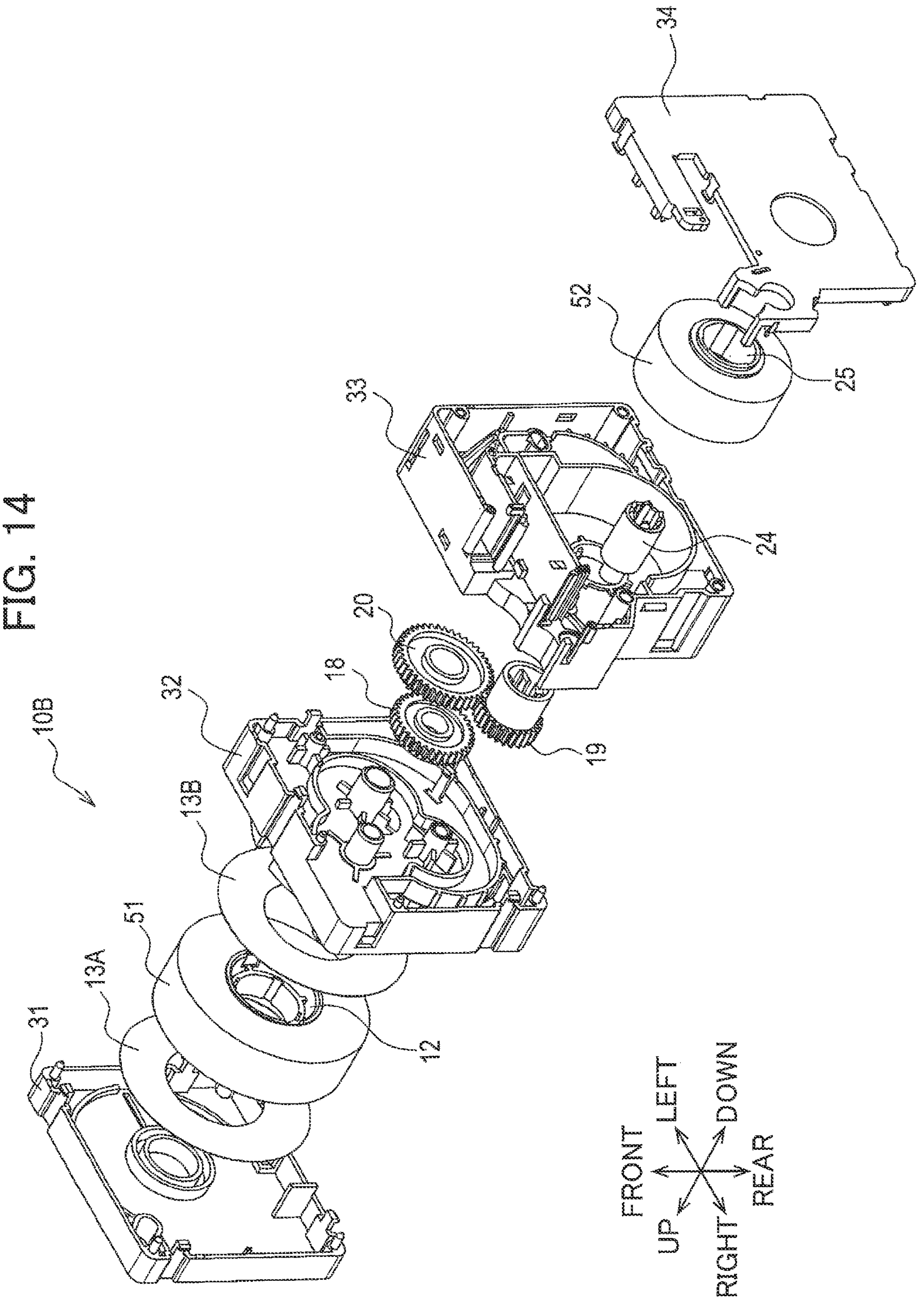
FIG. 14 is an exploded schematic perspective view of a printing cassette for a printing device according to a variation of the first and second embodiments.

For example, a printing cassette 10B illustrated in FIG. 14 includes a first roll 51 of thermal paper, and a second roll 52 of a laminate tape, in place of the first roll 11 and the second roll 14 in the printing cassette 10 according to the first embodiment, respectively. In the printing cassette 10B, the second roll 52 is wound over the input spool 25 of the second embodiment. The printing cassette 10B also includes the pinch roller 24 of the second embodiment, but does not include the second supply spool 15.

(3b) The printing cassette according to the depicted embodiments may include two or more of idle gears. Further, the transmission mechanism that engages the input gear and the output gear need not include a deceleration mechanism. In other words, the idle gear need not be a two-stage gear. Further, the printing cassette may include a transmission mechanism other than the gears.

(3c) In the printing cassette according to the embodiments described above, the output part for transmitting the drive force to the platen roller need not be a gear. For example, a roller or a spool may be employed as the output part. Similarly, the input part for inputting the drive force from the drive source need not be a gear. For example, a roller or a spool may be employed as the input part.

(3d) In the printing cassette according to the second embodiment, an additional spool may be used as a third supply spool around which a laminate tape is wound, and the input spool may be used as an ink ribbon take-up spool.

Figure 15:
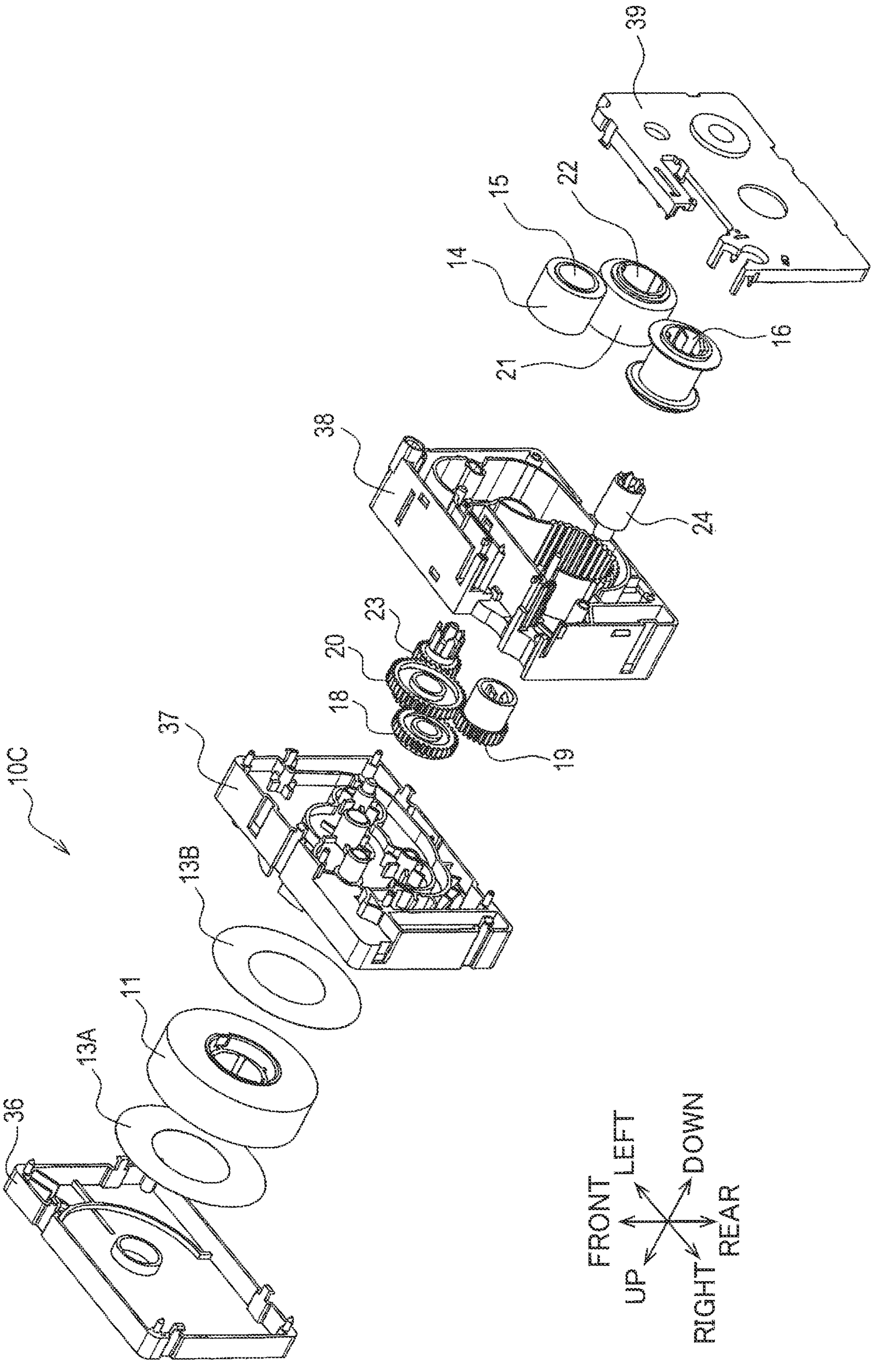
FIG. 15 is an exploded schematic perspective view of a printing cassette for a printing device according to another variation of the first and second embodiments.
Figure 16A:
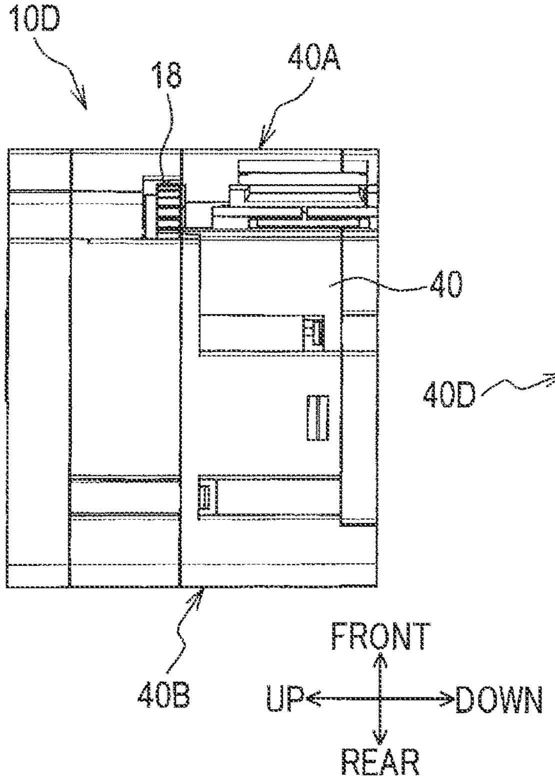
FIG. 16A is a right side view of a printing cassette for a printing device according to a still another variation of the first and second embodiments.
Figure 16B:
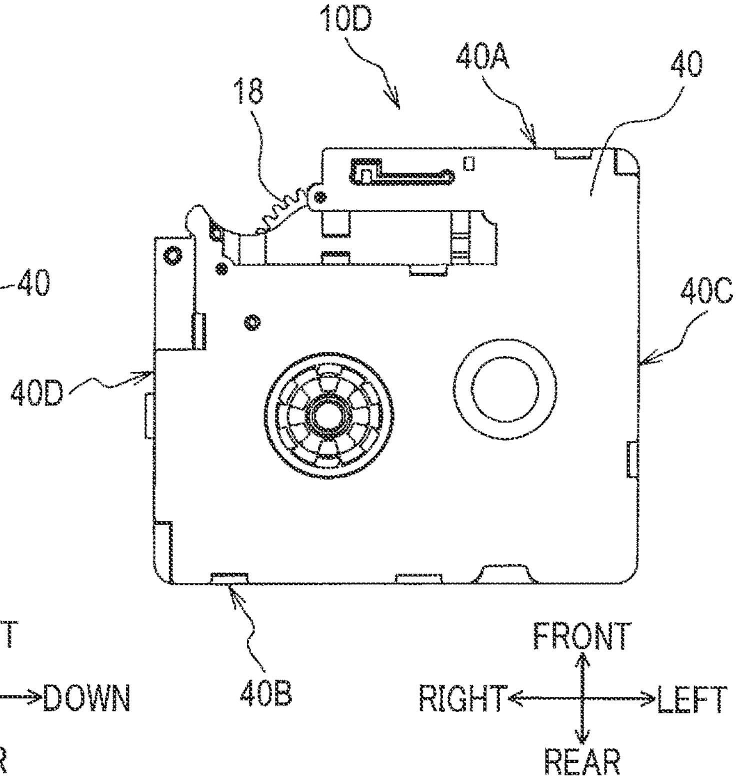
FIG. 16B is a bottom view of the printing cassette of FIG. 16A.
Figure 16C:
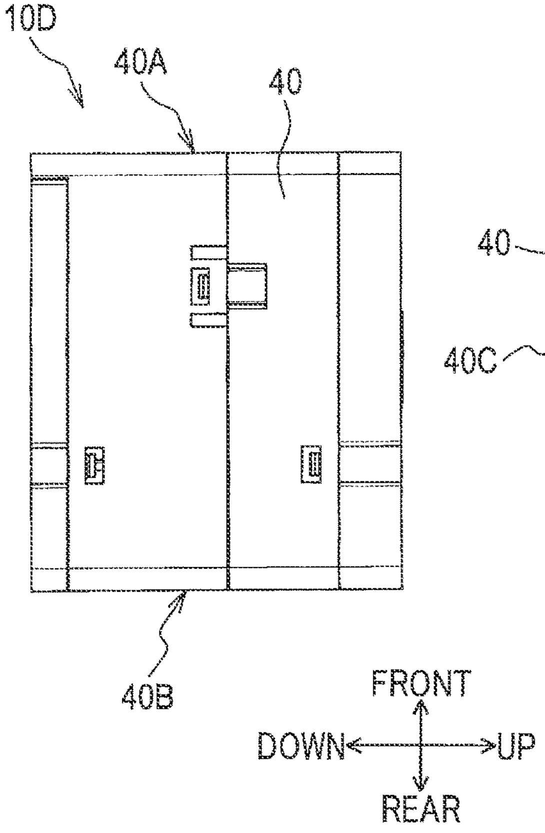
FIG. 16C is a left side view of the printing cassette of FIG. 16A.
Figure 16D:
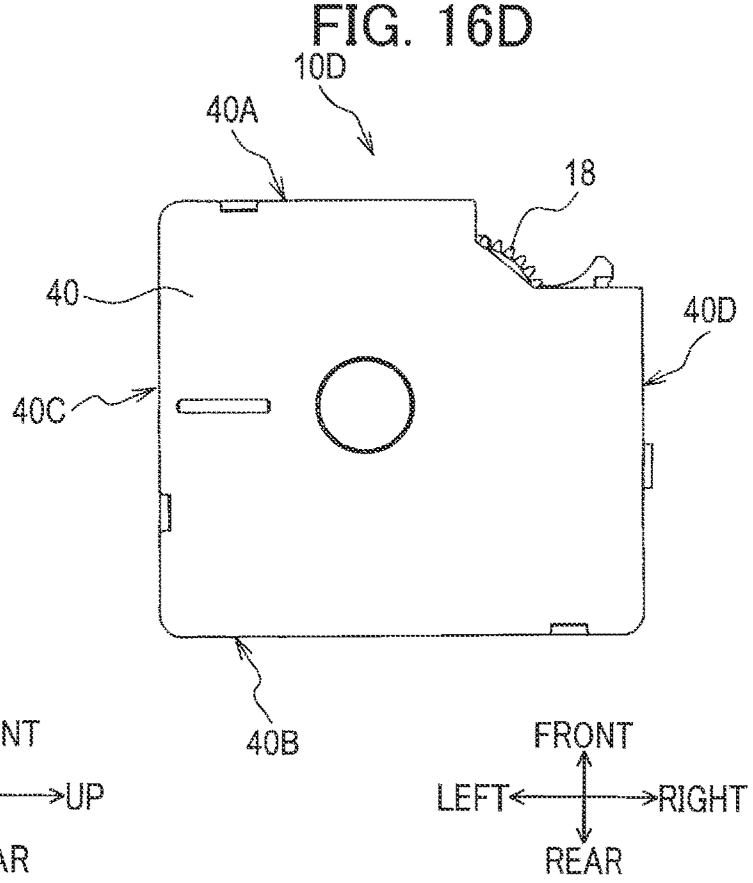
FIG. 16D is a front view of the printing cassette of FIG. 16A.

For example, a printing cassette 10C illustrated in FIG. 15 has such a structure that the third roll 21 of the laminate tape is wound around the additional spool 22 in the printing cassette 10A according to the second embodiment. The printing cassette 10C also includes the input spool 16 of the first embodiment, in place of the input spool 25 of the second embodiment. The input spool 16 is used as an ink ribbon take-up spool.

(3e) In the printing cassette of the depicted embodiments, the output part may be positioned outside of the outer edge of the case in the projection view described above. Further, the entirety of the output part need not overlap with the case in the up-down direction.

For example, in a printing cassette 10D illustrated in FIGS. 16A, 16B, 16C, and 16D, a portion of the output gear 18 does not overlap a case 40 in the up-down direction. That is, the case 40 has a notch where the portion of the output gear 18 does not overlap the case 40 in the up-down direction. Here, in the printing cassette 10D, the output gear 18 is positioned between a frontmost surface 40A and a rearmost surface 40B of the case 40, and between a leftmost surface 40C and a rightmost surface 40D of the case 40.

(3f) The functions possessed by a single component in the described embodiments may be distributed among a plurality of components, and/or the functions possessed by a plurality of components may be integrated into a single component. Still further, part of the structures in the described embodiments may be omitted. Still further, at least part of the structures in the described embodiments may be added to or replaced with the structures in other embodiments. Incidentally, every aspect included in the technical concepts that can be identified by the recitations in the claims can be the embodiments of the present disclosure.

What is claimed is:

1. A printing cassette comprising:
a print tape;
an input gear;
an idle gear engaging with the input gear, the idle gear being rotatable with the input gear;
an output gear engaging with the idle gear, the output gear being rotatable with rotation of the input gear and the idle gear, wherein the print tape is conveyable according to rotation of the output gear; and
a case that houses therein at least a part of the print tape, at least a part of the input gear, at least a part of the output gear, and at least part of the idle gear,
wherein one part of the output gear is positioned outside the case, and
wherein another part of the output gear is positioned inside an outer edge of the case.

2. The printing cassette according to claim 1, further comprising a head opening,
wherein the output gear is rotatable about a rotational axis extending in a first direction, and
wherein the one part of the output gear overlaps the head opening in the first direction.

3. The printing cassette according to claim 2,
wherein the rotational axis of the output gear passes through the head opening.

4. The printing cassette according to claim 2, further comprising an ink ribbon,
wherein the case comprises:
a second upstream support part positioned adjacent to and upstream of the head opening in a conveying direction of the ink ribbon and configured to support the ink ribbon; and
a second downstream support part positioned adjacent to and downstream of the head opening in the conveying direction of the ink ribbon and configured to support the ink ribbon, and
wherein a datum straight line connecting the second upstream support part and the second downstream support part overlaps the output gear in the first direction.

5. The printing cassette according to claim 4,
wherein the case further comprises:
a first upstream support part positioned adjacent to and upstream of the head opening in a conveying direction of the print tape and configured to support the print tape; and
a first downstream support part positioned adjacent to and downstream of the head opening in the conveying direction of the print tape and configured to support the print tape, and
wherein a datum straight line connecting the first upstream support part and the first downstream support part does not overlap the output gear in the first direction.

6. The printing cassette according to claim 4,
wherein the output gear overlaps the second upstream support part in the first direction.

7. The printing cassette according to claim 4,
wherein the case has a conveying path through which the print tape and the ink ribbon are configured to be conveyed in parallel to each other, and
wherein at least a part of the input gear overlaps the output gear at the conveying path in a direction perpendicular to the first direction and the conveying direction of the print tape.

8. The printing cassette according to claim 1,
wherein the output gear is rotatable about a rotational axis extending in a first direction,
wherein the output gear comprises a disc rotatable about the rotational axis and teeth formed on a surface of the disc, the surface being parallel to the first direction,
wherein the disc has one surface and another surface perpendicular to the first direction, the one surface facing the case in the first direction, and
wherein at least a part of the another surface does not face the case.

9. The printing cassette according to claim 1,
wherein the output gear is rotatable about a rotational axis extending in a first direction,
wherein the output gear comprises a disc rotatable about the rotational axis and teeth formed on a surface of the disc, the surface being parallel to the first direction, and
wherein a portion of the output gear positioned outside the case provides a circumferential length along a dedendum circle of the output gear, the circumferential length being greater than or equal to ⅛ of an entire circumference of the dedendum circle and smaller than or equal to ⅓ of the entire circumference of the dedendum circle.

10. The printing cassette according to claim 1,
wherein the output gear is rotatable about a rotational axis extending in a first direction,
wherein the output gear comprises a disc rotatable about the rotational axis and teeth formed on a surface of the disc, the surface being parallel to the first direction,
wherein the case comprises a protruding portion arranged to overlap the output gear in the first direction, the protruding portion having an endface parallel to the first direction, the endface being positioned between a dedendum circle of the output gear and the rotational axis of the output gear.

11. The printing cassette according to claim 1, further comprising a head opening, wherein the input gear is rotatable about a rotational axis extending in a first direction, wherein the case comprises:

a first upstream support part positioned adjacent to and upstream of the head opening in a conveying direction of the print tape and configured to support the print tape; and a first downstream support part positioned adjacent to and downstream of the head opening in the conveying direction of the print tape and configured to support the print tape, and wherein at least a part of the output gear overlaps a datum triangle in the first direction, the datum triangle connecting the first upstream support part, the first downstream support part and the rotational axis of the input gear.

12. The printing cassette according to claim 1, further comprising:

an ink ribbon; and an input spool configured to take up the ink ribbon, wherein the input gear is rotatable about a rotational axis extending in a first direction, wherein the input spool has an inner peripheral surface formed with splines, and wherein the rotational axis of the input gear passes through a hollow part defined by the inner peripheral surface of the input spool.

13. The printing cassette according to claim 1, further comprising:

a first roll of the print tape; and a second roll of an ink ribbon, wherein the first roll, the output gear and the second roll are juxtaposed in a first direction in order of the first roll, the output gear and the second roll.

14. The printing cassette according to claim 13, wherein the case comprises:

a first case part configured to accommodate the first roll;

a second case part configured to accommodate the second roll; and a path along which the print tape constituting the first roll is configured to be conveyed from the first case part to the second case part.

15. The printing cassette according to claim 1, wherein the printing cassette is configured to be mounted in a device body of a printing device, the device body comprising a drive source and a platen roller configured to convey the print tape, wherein a drive force from the drive source is configured to be inputted into the input gear, and wherein the output gear is configured to transmit the drive force to the platen roller.

16. A printing cassette comprising:

a print tape;

an input gear;

an idle gear engaging with the input gear, the idle gear being rotatable with the input gear;

an output gear engaging with the idle gear, the output gear being rotatable about a rotational axis extending in a first direction with rotation of the input gear and the idle gear, wherein the print tape is conveyable according to rotation of the output gear; and a case that houses therein at least a part of the print tape, at least a part of the input gear, at least a part of the output gear, and at least part of the idle gear, wherein a part of the output gear is positioned outside the case, and wherein an entirety of the output gear overlaps the case in the first direction.

17. A printing cassette comprising:

a print tape;

an input gear;

an idle gear engaging with the input gear, the idle gear being rotatable with the input gear;

an output gear engaging with the idle gear, the output gear being rotatable about a rotational axis extending in a first direction with rotation of the input gear and the idle gear, wherein the print tape is conveyable according to rotation of the output gear; and a case that houses therein at least a part of the print tape, at least a part of the input gear, at least a part of the output gear, and at least part of the idle gear, wherein the case has:

a first surface and a second surface constituting respective endfaces of the case in a second direction perpendicular to the first direction; and a third surface and a fourth surface constituting respective endfaces of the case in a third direction perpendicular to the first direction and the second direction, and wherein the output gear is positioned between the first surface and the second surface and between the third surface and the fourth surface.

* * * * *